US006761438B2

(12) United States Patent
Sato et al.

(10) Patent No.: US 6,761,438 B2
(45) Date of Patent: Jul. 13, 2004

(54) INK PUMP SELECTIVE DRIVER AND INK JET PRINTER INCORPORATING THE SAME

(75) Inventors: Kazuhiko Sato, Nagano (JP); Kenichiro Arai, Nagano (JP); Hiroshi Narita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/292,910

(22) Filed: Nov. 13, 2002

(65) Prior Publication Data

US 2003/0107623 A1 Jun. 12, 2003

(30) Foreign Application Priority Data

Nov. 13, 2001 (JP) .................................... P2001-347611
Nov. 13, 2001 (JP) .................................... P2001-347612

(51) Int. Cl.[7] ............................ G41J 2/17; F16H 37/02; F16H 47/08

(52) U.S. Cl. ............................ 347/84; 475/78; 475/208

(58) Field of Search ..................... 347/84, 85; 354/400, 354/247, 214; 475/78, 208; 396/48, 410; 446/175

(56) References Cited

U.S. PATENT DOCUMENTS 3,580,107 A * 5/1971 Orshansky, Jr. .............. 475/78
4,717,364 A * 1/1988 Furukawa ................... 446/175
4,945,370 A * 7/1990 Shimada et al. ............ 396/410
5,168,295 A * 12/1992 Yoshihara et al. ............ 396/48
5,365,301 A 11/1994 Sugita et al.
6,561,940 B2 * 5/2003 Goi et al. ................... 475/208

FOREIGN PATENT DOCUMENTS

| | | |
|---|---|---|
| EP | 0 785 084 | 7/1997 |
| JP | 5-321989 | 7/1993 |
| JP | 08-112913 | 5/1996 |
| JP | 2001-080087 | 3/2001 |
| JP | 2001-187463 | 7/2001 |
| JP | 2001-310484 | 11/2001 |
| JP | 2001-353881 | 12/2001 |

* cited by examiner

*Primary Examiner*—Anh T. N. Vo
(74) *Attorney, Agent, or Firm*—Nixon & Vanderhye P.C.

(57) ABSTRACT

In a pump driver for selectively driving a plurality of pumps, a sun gear is rotated by a single drive source. A planetary gear is meshed with the sun gear. A planetary carrier rotatably supports the planetary gear revolvably around the sun gear. A plurality of driving gears are arranged in a one-by-one manner with respect to the pumps such that the planetary gear meshes with one of the driving gears to selectively drive one of the pumps. A revolution limiter allows a revolution of the planetary gear in a first direction and restricts a revolution of the planetary gear in a second direction opposite to the first direction at a position where the planetary gear meshes with one of the driving gears.

10 Claims, 17 Drawing Sheets

INK PUMP SELECTIVE DRIVER AND INK JET PRINTER INCORPORATING THE SAME

BACKGROUND OF THE INVENTION

The present invention relates to an ink pump selective driver for selectively driving a plurality of tube pumps to supply different kinds of ink. Also, the invention relates to an ink jet printer provided with such an ink pump selective driver.

In recent years, ink jet printers making use of ink of three colors to perform color printing have become widespread. In these kinds of ink jet printers, three or more ink supply passages are arranged for supplying ink of respective colors, and ink pumps disposed in the respective ink supply passages are selectively driven to feed necessary color ink individually with pressure.

With ink jet printers of this construction, there is involved an inconvenience that ink jet printers are made large in size and high in cost, because when rotary drive sources (motors or the like), respectively, for exclusive use are mounted on respective ink pumps selectively driven, the number of the rotary drive sources installed is increased corresponding to the kinds of color ink as supplied. Therefore, it is desirable to provide an ink selector mechanism making use of a single rotary drive source to be able to selectively drive three or more ink pumps.

A related-art selective driver is composed of a single rotary drive source and clutch mechanisms arranged in power transmitting paths between respective ink pumps. Nonetheless, it is required that actuators such as solenoids or the like be attached to the clutch mechanisms to switch over the same. The ink selector mechanism provided with a single rotary drive source and a plurality of clutch mechanisms is advantageous in making an ink jet printer small in size and low in cost, as compared with a mechanism in which rotary drive sources for exclusive use are provided for every ink pump. Since actuators such as solenoids or the like for switching of the clutch mechanisms are required separately, however, there is a limitation in making an ink jet printer small in size and low in cost.

SUMMARY OF THE INVENTION

It is an object of the invention to provide an ink pump selective driver capable of selectively driving a plurality of ink pumps, for example, three or more with the use of a single drive source and achieving miniaturization of and cost reduction of an ink jet printer without the separate provision of actuators such as solenoids or the like.

Also, it is an object of the invention to provide a small-sized and inexpensive ink jet printer provided with such an ink pump selective driver.

In order to attain the above and other objects, according to the present invention, there is provided a pump driver for selectively driving at least three pumps, comprising:

a drive source;

a sun gear, rotated by the drive source;

a planetary gear, meshed with the sun gear;

a planetary carrier, which rotatably supports the planetary gear revolvably around the sun gear;

a plurality of driving gears, arranged with respect to the pumps such that the planetary gear meshes with one of the driving gears to selectively drive one of the pumps; and a revolution limiter, which allows a revolution of the planetary gear in a first direction and restricts a revolution of the planetary gear in a second direction opposite to the first direction at a position where the planetary gear meshes with the one of the driving gears.

With this configuration, when the planetary gear revolves a predetermined angle around the sun gear in the first direction, one of the driving gears is selected. Thereafter, when the planetary gear revolves reversely in the second direction, the revolution limiter puts the planetary gear in a state of meshing with one of the pump drive gears. Accordingly, the pump drive gear is rotationally driven via the planetary gear, so that an ink pump, to which the pump drive gear is attached, is driven.

Preferably, the revolution limiter includes a ratchet mechanism. For example, the ratchet mechanism may include a ratchet lever, provided on the planetary carrier, and ratchet teeth, arranged, for example, in a one-by-one manner with respect to the pumps, to which the ratchet lever engages.

In such a configuration, it suffices that a constituent element, such as a ratchet mechanism, be provided in power transmitting paths from the drive source to the respective pumps without the provision of actuators such as solenoids or the like for switching of the clutch mechanisms. Accordingly, it is possible to realize a small-sized and inexpensive driver.

Preferably, the pump driver further comprises a revolution position detector, which detects a revolution angle of the planetary gears. Here, it is preferable that the revolution position detector includes: a plurality of detection pieces arranged with respect to the pumps; a first detector, which detects a predetermined one of the detection pieces, so that it is detected when the planetary gear meshes with a predetermined one of the driving gears; and a second detector, which detects remaining ones of the detection pieces, so that it is detected when the planetary gear meshes with any one of remaining ones of the driving gears.

In such a configuration, by controlling the drive source on the basis of detection of position by the revolving position detector, it is possible to surely perform selective driving of the pumps. Also, inexpensive motors other than step motors capable of controlling a rotating angular position with accuracy can be used as the drive source.

Preferably, each of the pumps includes a flexible tube. Here, each of the pumps compresses the flexible tube when an associated one of the driving gears is rotated in a forward direction, and releases a compressed state of the flexible tube when the associated one of the driving gears is rotated in a rearward direction.

If the flexible tube in the pump not driven remained in the compressed state, there is caused a bad situation that the ink tube would deteriorate. According to the above configuration, the compressed state of the flexible tube is released when the planetary gear is revolved in the first direction to operatively select an ink pump being driven.

To realize such a releasing operation, the pump driver may further comprise: a plurality of release planetary gears, preferably provided in a one-by one manner with respect to the pumps and meshed with the sun gear; and a release planetary carrier, which rotatably supports the release planetary gears revolvably around the sun gear. Here, the release planetary gears mesh with the driving gears when the planetary gears are revolved in the first direction at a predetermined angle. The release planetary gears are disengaged from the driving gears when the planetary gears are revolved in the second direction.

In this case, the planetary gear is revolved in the first direction, while passing meshing positions in which it meshes with the respective driving gears, which are rotationally driven by the release planetary gears. The respective driving gears thus rotating give a suitable load to the planetary gear when the planetary gear passes the meshing positions, so that the planetary gear can smoothly pass the meshing positions.

In the case where the rotation speed of the respective driving gears is large, there is a probability that revolution of the planetary gear is inhibited in the meshing positions.

Accordingly, it is preferable that a first rotation speed of the driving gears established by the release planetary gears is lower than a second speed of the driving gears established by the planetary gear.

According to the present invention, there is also provided an ink jet printer, comprising:

- a print head;
- a plurality of tanks, for example, at least three, each storing ink therein;
- a plurality of pumps each associated with one of the tanks;
- a drive source, and preferably a single drive source;
- a sun gear, rotated by the drive source;
- a planetary gear, meshed with the sun gear;
- a planetary carrier, which rotatably supports the planetary gear revolvably around the sun gear;
- a plurality of driving gears, arranged with respect to the pumps such that the revolved planetary gear meshes with one of the driving gears to selectively drive one of the pumps; and
- a revolution limiter, which allows a revolution of the planetary gear in a first direction and restricts a revolution of the planetary gear in a second direction opposite to the first direction at a position where the planetary gear meshes with the one of the driving gears.

According to the present invention, there is also provided an ink jet printer, comprising:

- a print head;
- a plurality of internal tanks, each storing ink therein supplied from a corresponding one of a plurality of external tanks, and to be supplied to the print head;
- a plurality of pumps, each associated with one of the internal tanks;
- a detector, which detects an amount of ink in each of the internal tanks; and
- a pump driver, which selectively drives the pumps in accordance with an output of the detector, the pump driver including:
- a drive source, and preferably a single drive source;
- a sun gear, rotated by the drive source;
- a planetary gear, meshed with the sun gear;
- a planetary carrier, which rotatably supports the planetary gear revolvably around the sun gear;
- a plurality of driving gears, arranged with respect to the pumps such that the revolved planetary gear meshes with one of the driving gears to selectively drive one of the pumps; and
- a revolution limiter, which allows a revolution of the planetary gear in a first direction and restricts a revolution of the planetary gear in a second direction opposite to the first direction at a position where the planetary gear meshes with the one of the driving gears.

With the provision of a small-sized and inexpensive pump driver for selectively driving three or more ink pumps, it is possible to achieve miniaturization and cost reduction of the ink jet printer.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

The invention will be described below in detail with reference to the drawings. In addition, the following embodiments show a configuration of the invention, and it is not intended that the invention is limited to the embodiments.

Figure 1:
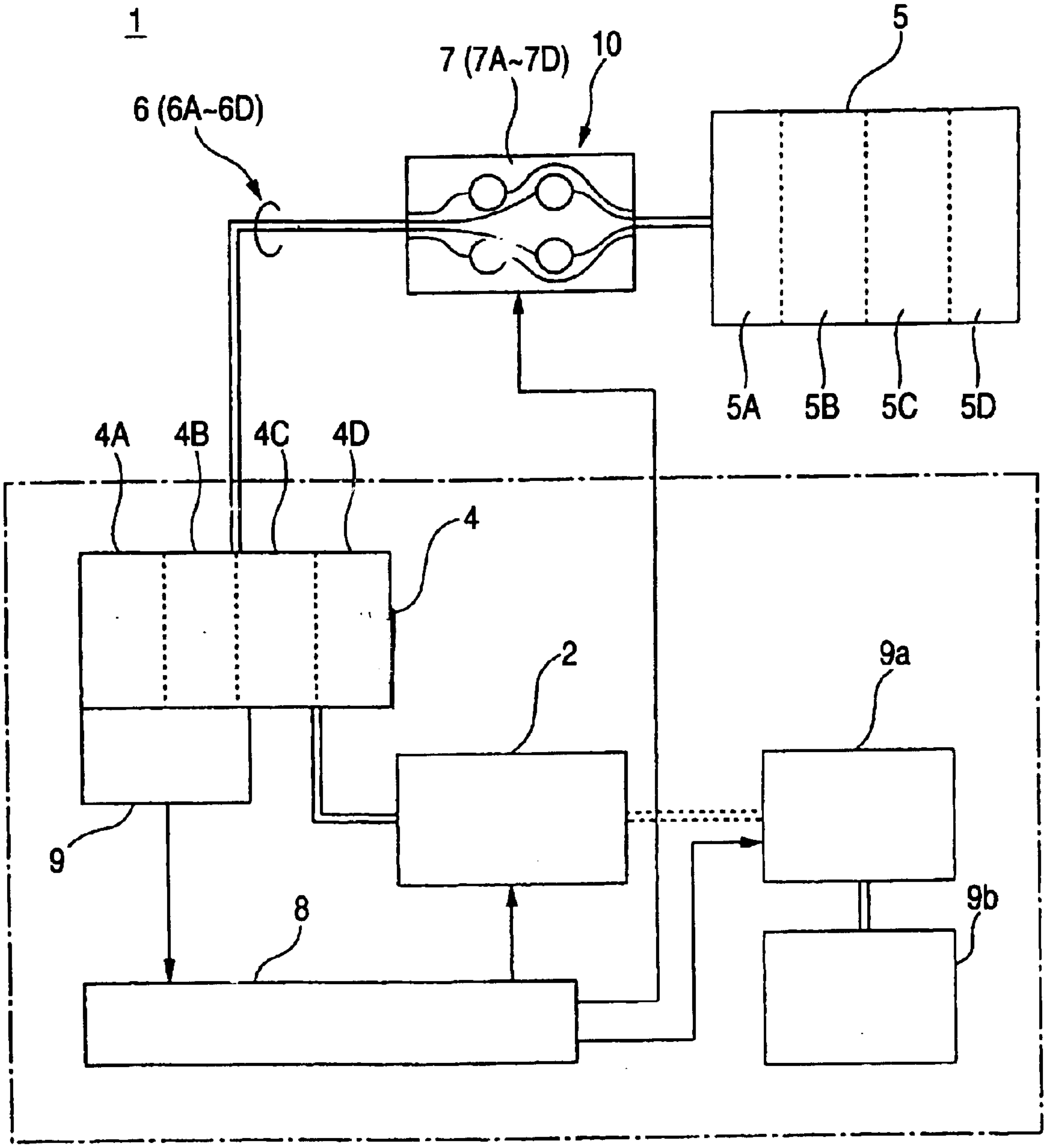
FIG. 1 is a schematic view showing an ink supply system of an ink jet printer according to one embodiment of the invention.

As shown in FIG. 1, a print head 2 in an ink jet printer 1 according to one embodiment of the invention performs printing with the use of yellow, magenta, cyan, and black inks. Ink of respective colors is supplied to the print head 2 from an ink tank 4. The ink tank 4 is comprised of four ink tanks 4A, 4B, 4C, 4D storing ink of respective colors, the respective ink tanks 4A to 4D being replenished with ink of respective colors from respective ink tanks 5A to 5D of an external tank 5 through an ink tube 6 (6A to 6D). A pump unit 10 provided with a tube pump 7 (7A to 7D) is provided midway along the respective ink tubes 6A to 6D, and at the time of replenishing ink, the tube pumps 7A to 7D provided on the ink tubes to supply ink being replenished are selectively driven to compressively feed the ink.

The ink replenishing action for the respective ink tanks 4A to 4D is controlled by a controller 8, which controls driving of respective parts of the printer. More specifically, the controller 8 selectively drives the corresponding tube pumps 7A to 7D for replenishing of ink when ink ends of the ink tanks 4A to 4D are detected on the basis of outputs of optical sensors 9 for detection of ink ends. The optical sensors 9 in this embodiment are mounted on the respective ink tanks 4A to 4D.

Further, the ink jet printer 1 comprises a waste ink pump 9*a* for drawing and removing a waste ink from the print head 2 in a cleaning section (not shown), and a waste tank 9*b* for recovery of the waste ink. Driving of the waste ink pump 9*a* may also be controlled by the controller 8.

Figure 2:
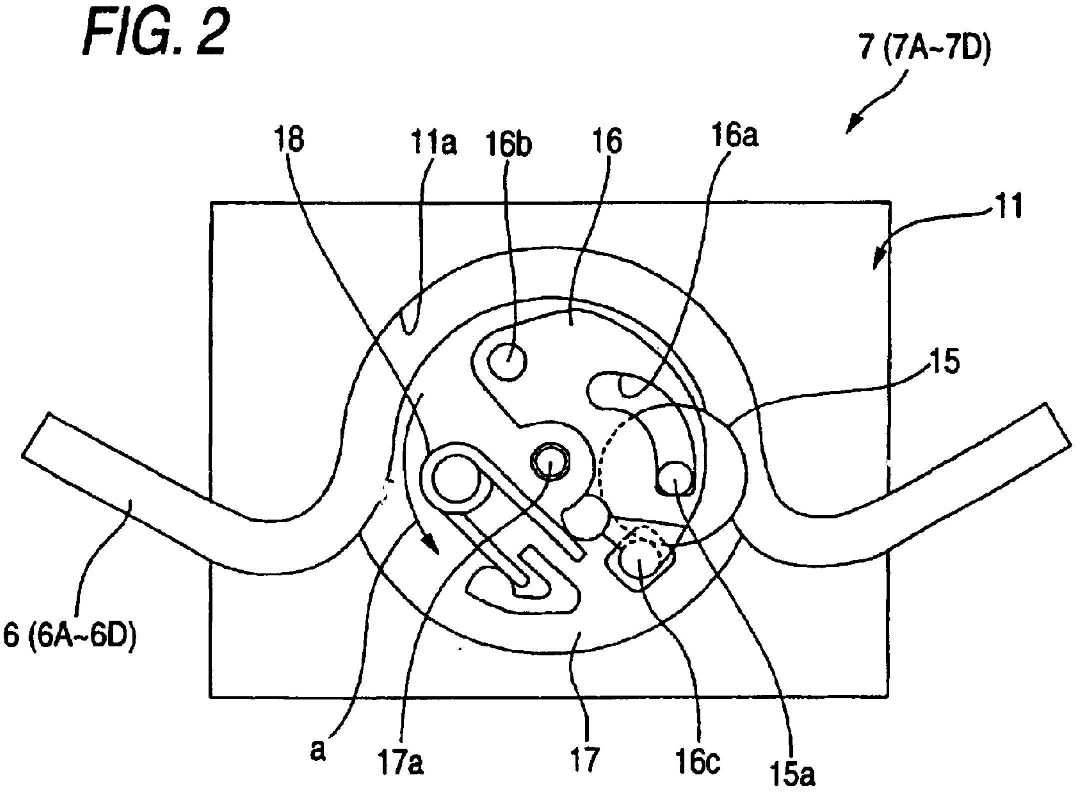
FIG. 2 is a view illustrating a driving state of a tube pump of FIG. 1.
Figure 3:
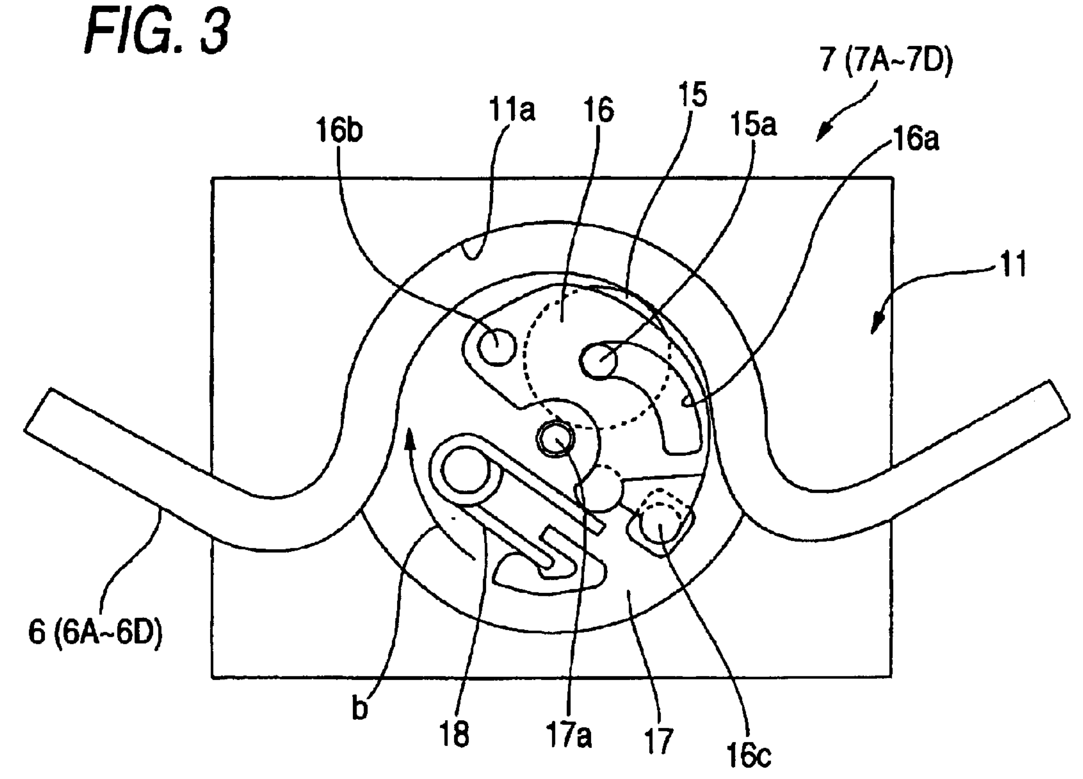
FIG. 3 is a view illustrating a release state of the tube pump of FIG. 1.

FIG. 2 is a view illustrating a driving state of the tube pump 7 (7A to 7D), and FIG. 3 is a view illustrating a stop state (release action) of the tube pump 7 (7A to 7D). As shown in these drawings, the tube pump 7 comprises a roller 15, a lever 16, a rotary plate 17, and a spring 18. The ink tube 6 (6A to 6D) is flexible at least in its portion, which is crushed by the roller 15, the portion being disposed along an arcuate guide portion 11*a* formed in a unit casing 11 of the pump unit 10.

The lever 16 is formed with a cam groove 16*a* for rotatably and moveably supporting a roller spindle 15*a*. One end of the cam groove 16*a* is extended radially inward relative to a circumferential direction of the rotary plate 17 such that the roller 15 is moved radially when the roller spindle 15*a* is guided along the curve. The rotary plate 17 is rotatably provided in the unit casing 11 to rotatably support the lever 16 through a lever spindle 16*b*. The lever 16 is biased outward by the spring 18 and limited in a range of turning by a stopper 16*c*. Also, a pump drive shaft 17*a* projecting upward is formed integrally on a center of the rotary plate 17.

In the case where the tube pump 7 (7A to 7D) is to be driven, the rotary plate 17 is rotated in a forward direction (represented by an arrow a) as shown in FIG. 2. When the rotary plate 17 is rotated in a forward direction, the roller 15 is moved radially along the curve of the cam groove 16*a* and thus the ink tube 6 is pressed. When the rotary plate 17 continues to be rotated in this state, the roller 15 moves along the arcuate guide portion 11*a* while pressing the ink tube 6, so that ink received in the ink tube 6 is compressively fed toward the ink tank 4.

Meanwhile, in the case where the tube pump 7 (7A to 7D) is to be stopped, the rotary plate 17 is once rotated in a reverse direction (represented by an arrow b) and then stopped as shown in FIG. 3. When the rotary plate 17 is rotated in a reverse direction, the roller 15 moves radially inward along the curve of the cam groove 16*a* and thus pressing of the ink tube 6 is released. The tube pump 7 (7A to 7D) is stopped in this state, whereby permanent set and deterioration of the ink tube 6 are avoided.

Figure 4:
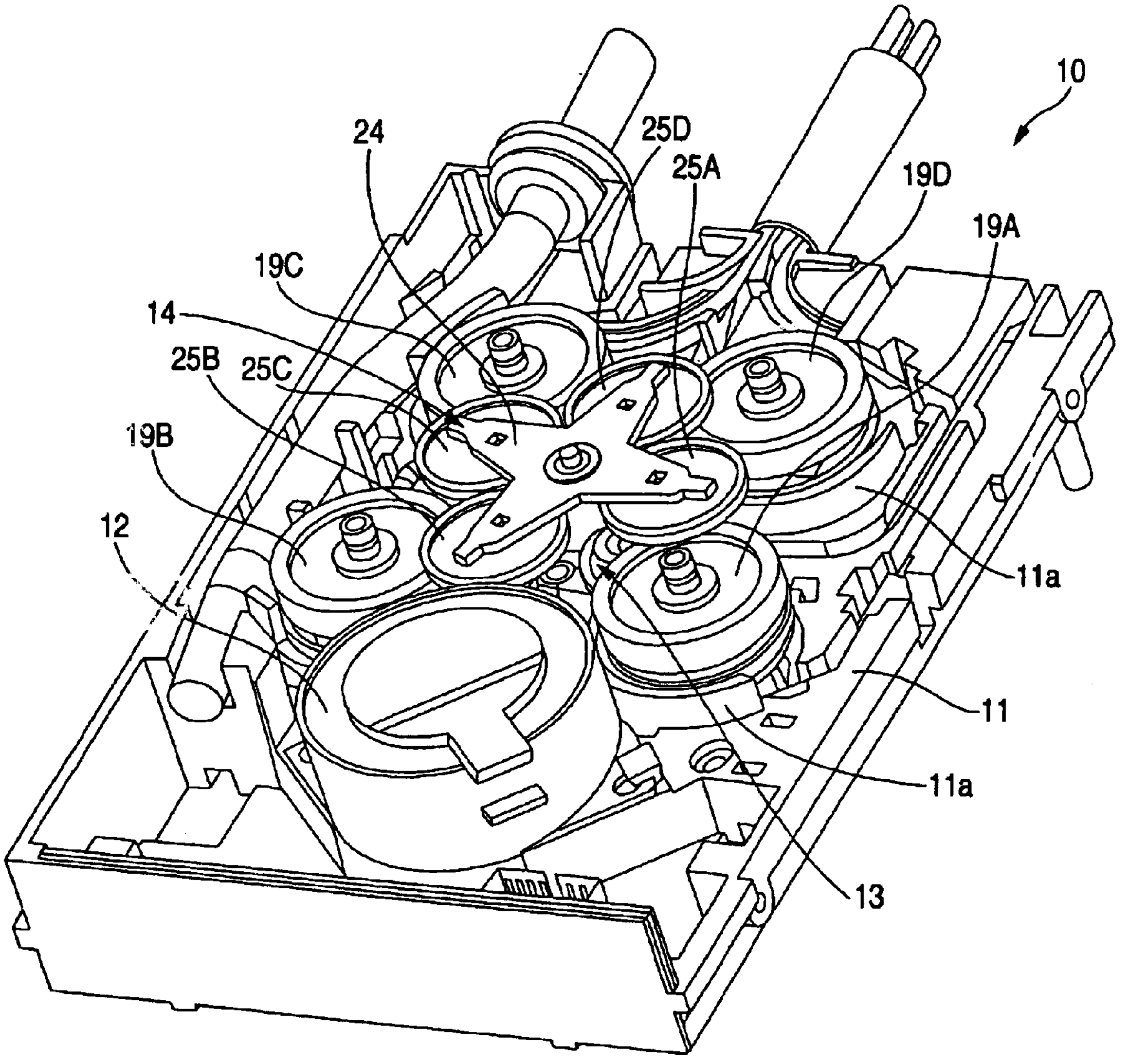
FIG. 4 is a perspective view showing the pump unit of FIG. 1.
Figure 5:
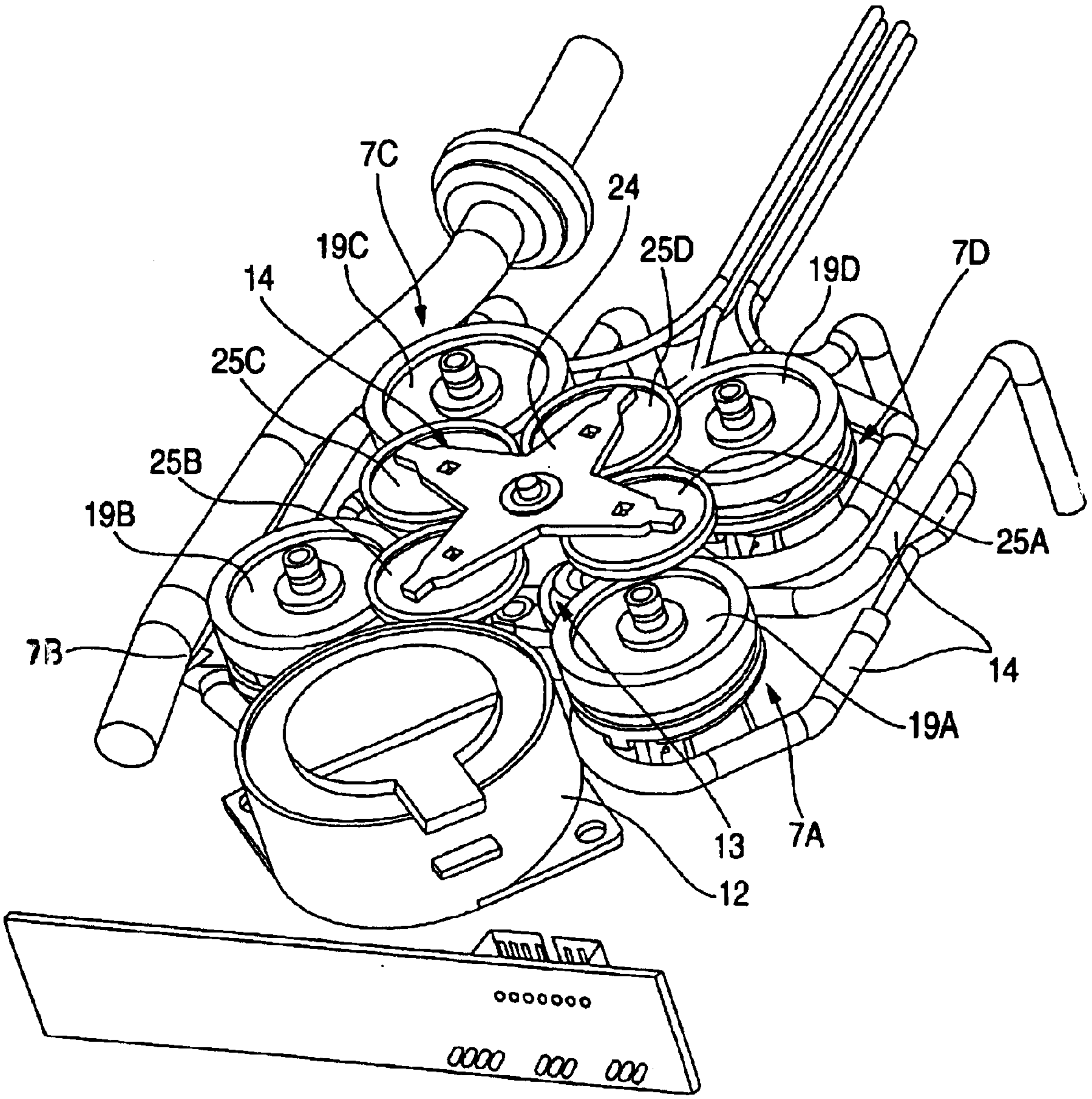
FIG. 5 is a perspective view showing the pump unit with a unit casing omitted.

FIG. 4 is a perspective view showing the pump unit 10 provided with the tube pumps 7A to 7D constructed in the above manner, and FIG. 5 is a perspective view showing the pump unit with the unit casing 11 omitted. The pump unit 10 comprises a single motor (drive source) 12 for driving the four tube pumps 7A to 7D mounted in the unit casing 11, a selector mechanism 13 for selectively transmitting rotation of the motor 12 to the respective tube pumps 7A to 7D to drive them, and a releaser mechanism 14 for switching the respective tube pumps 7A to 7D to a release state.

Figure 6:
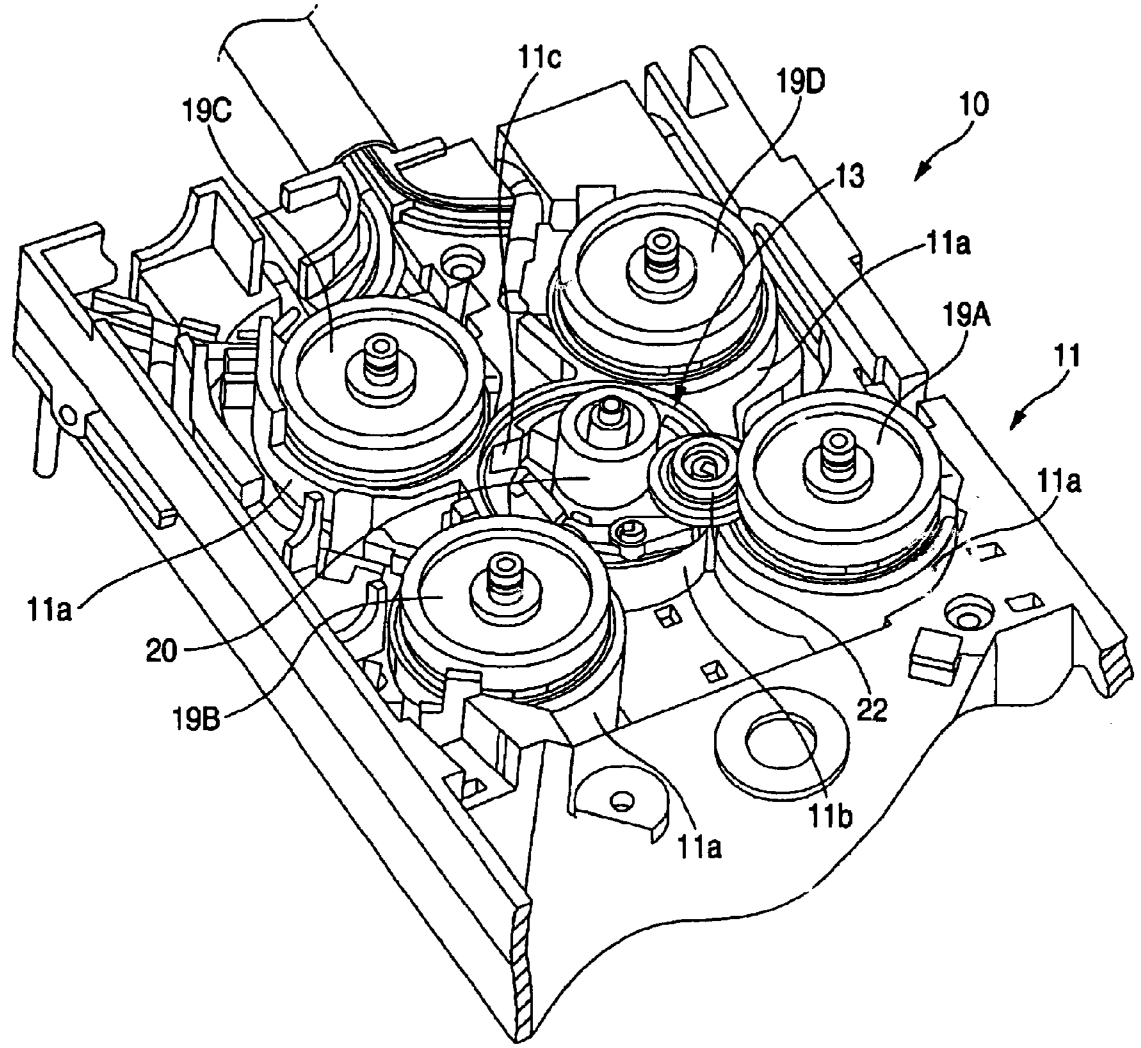
FIG. 6 is a perspective view showing the pump unit with a releaser mechanism.
Figure 7:
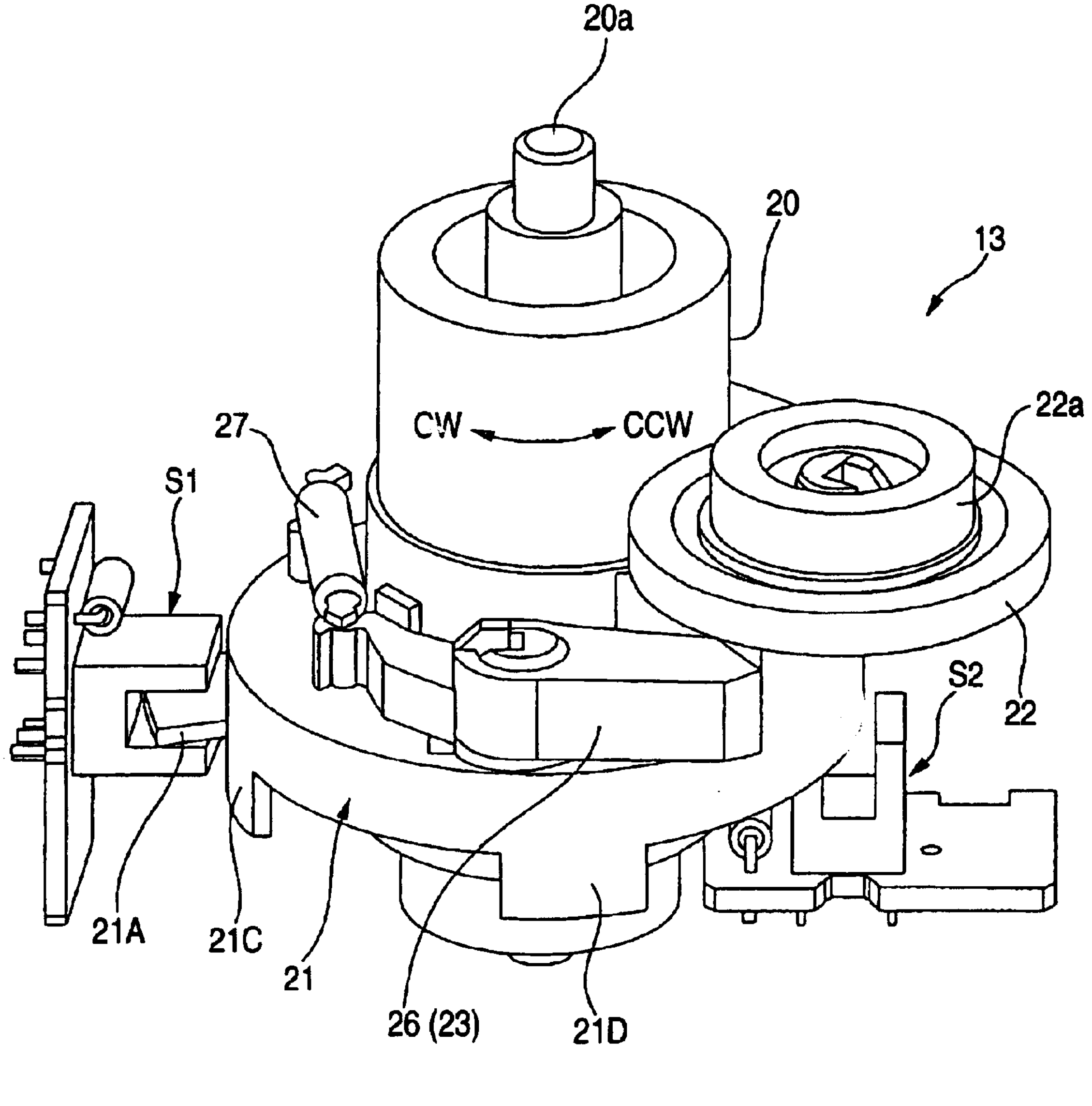
FIG. 7 is a perspective view showing only a selector mechanism.
Figure 8A:
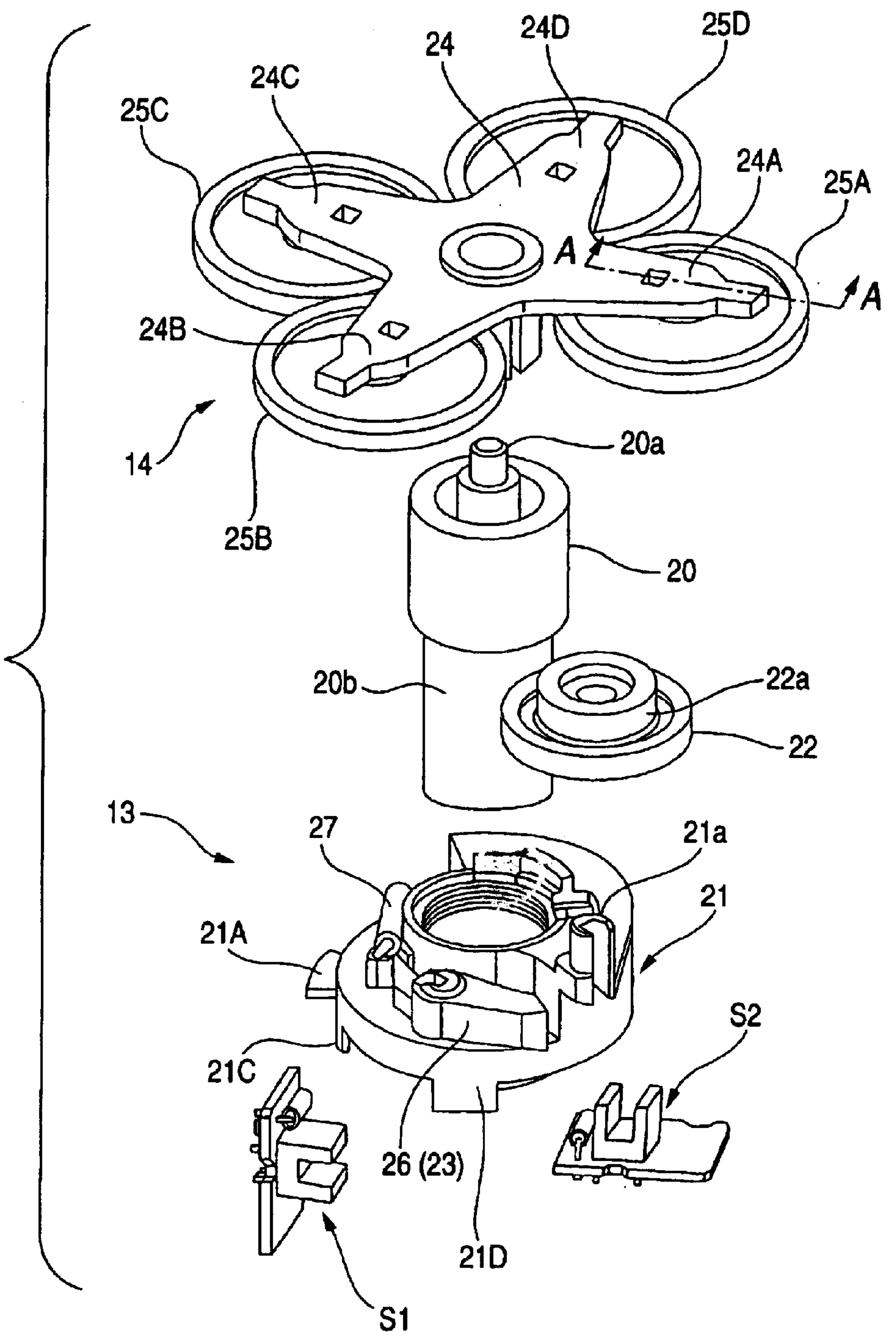
FIG. 8A is an exploded, perspective view showing the selector mechanism and the releaser mechanism.
Figure 8B:
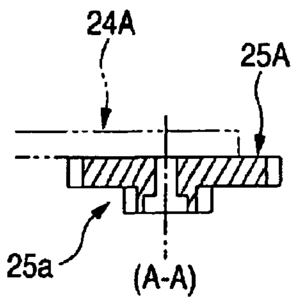
FIG. 8B is a cross sectional view showing release planetary gears.
Figure 9:
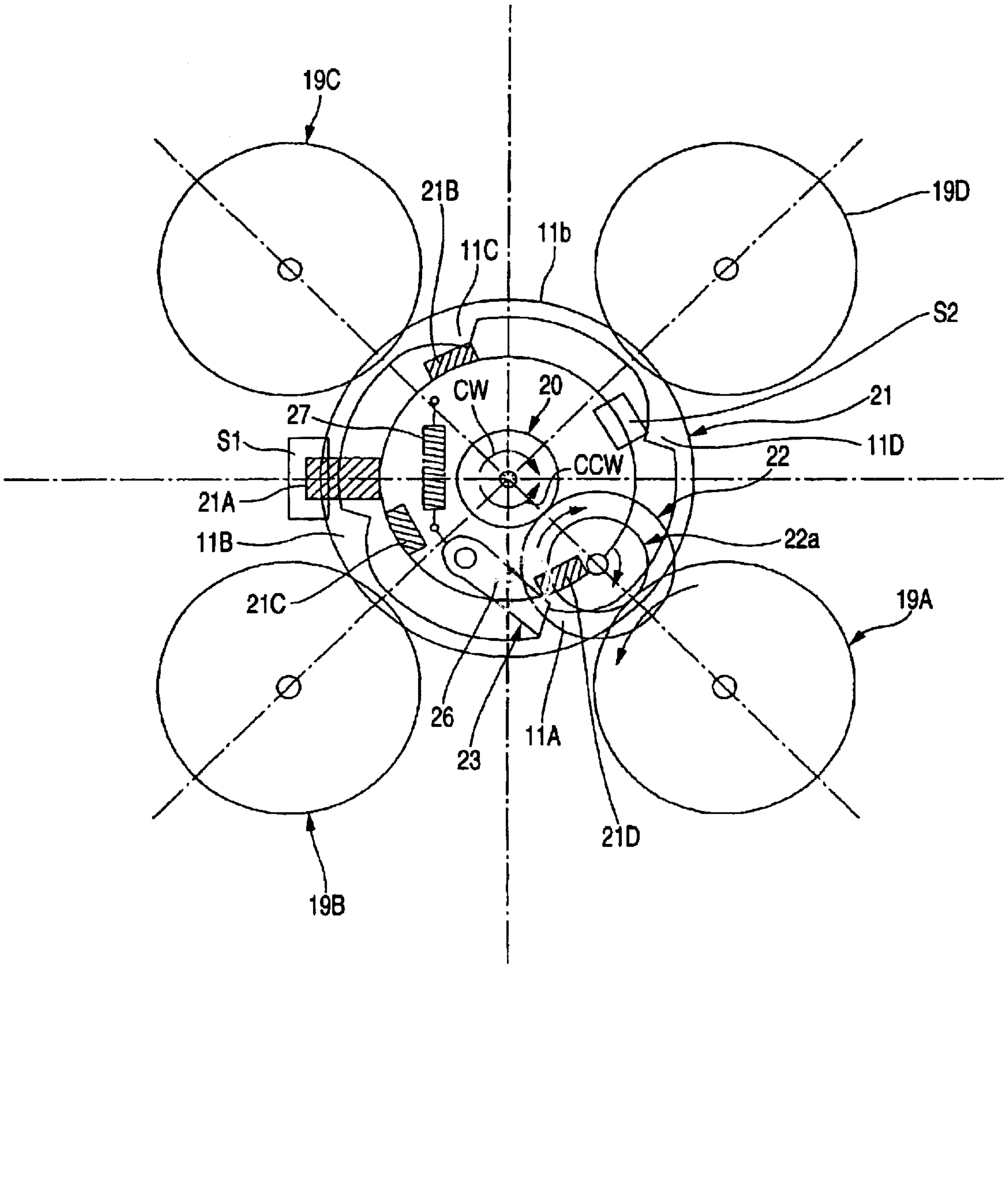
FIG. 9 is a view illustrating the selector mechanism.
Figure 10A:
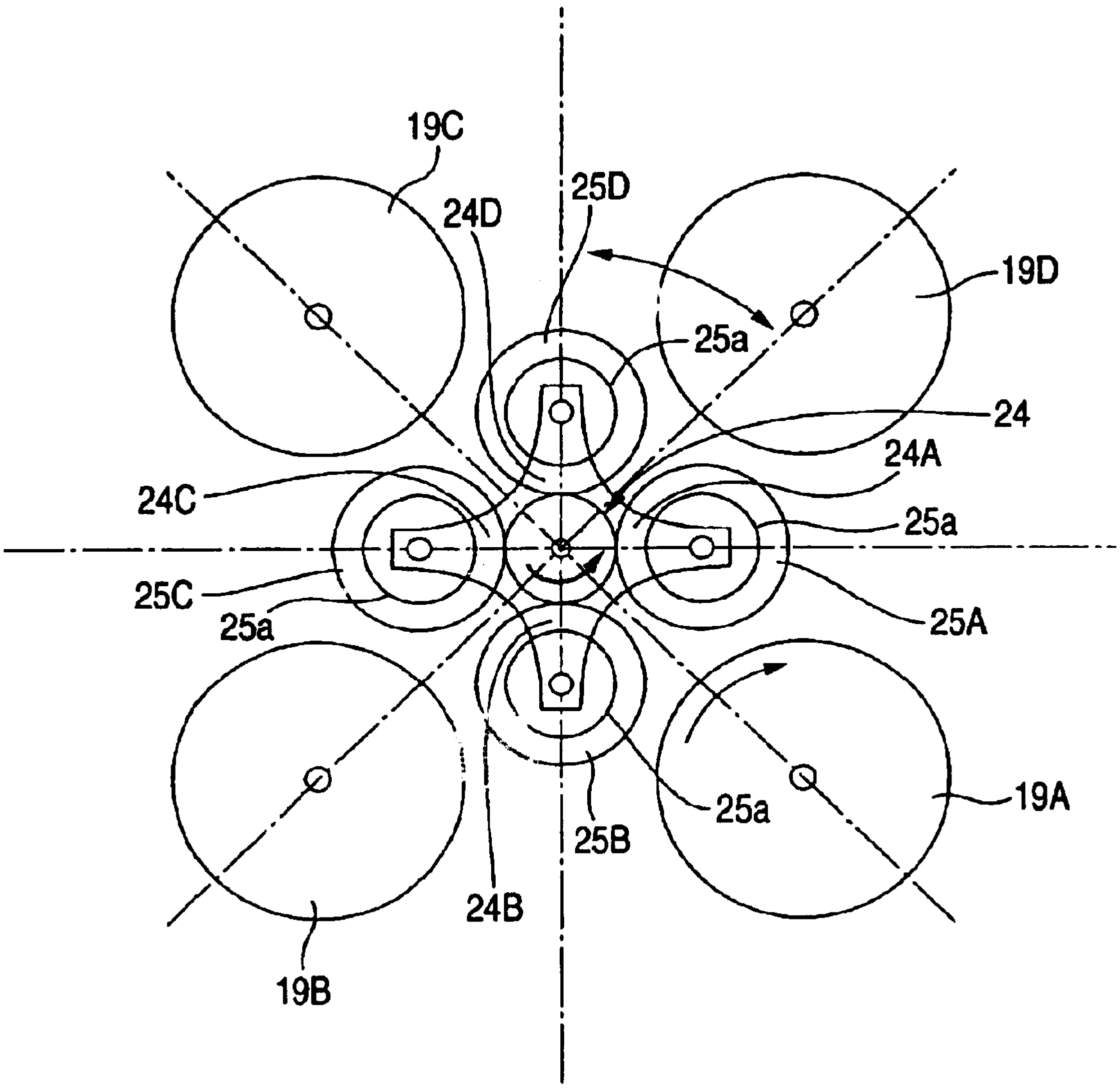
FIGS. 10A and 10B are views illustrating the releaser mechanism.
Figure 10B:
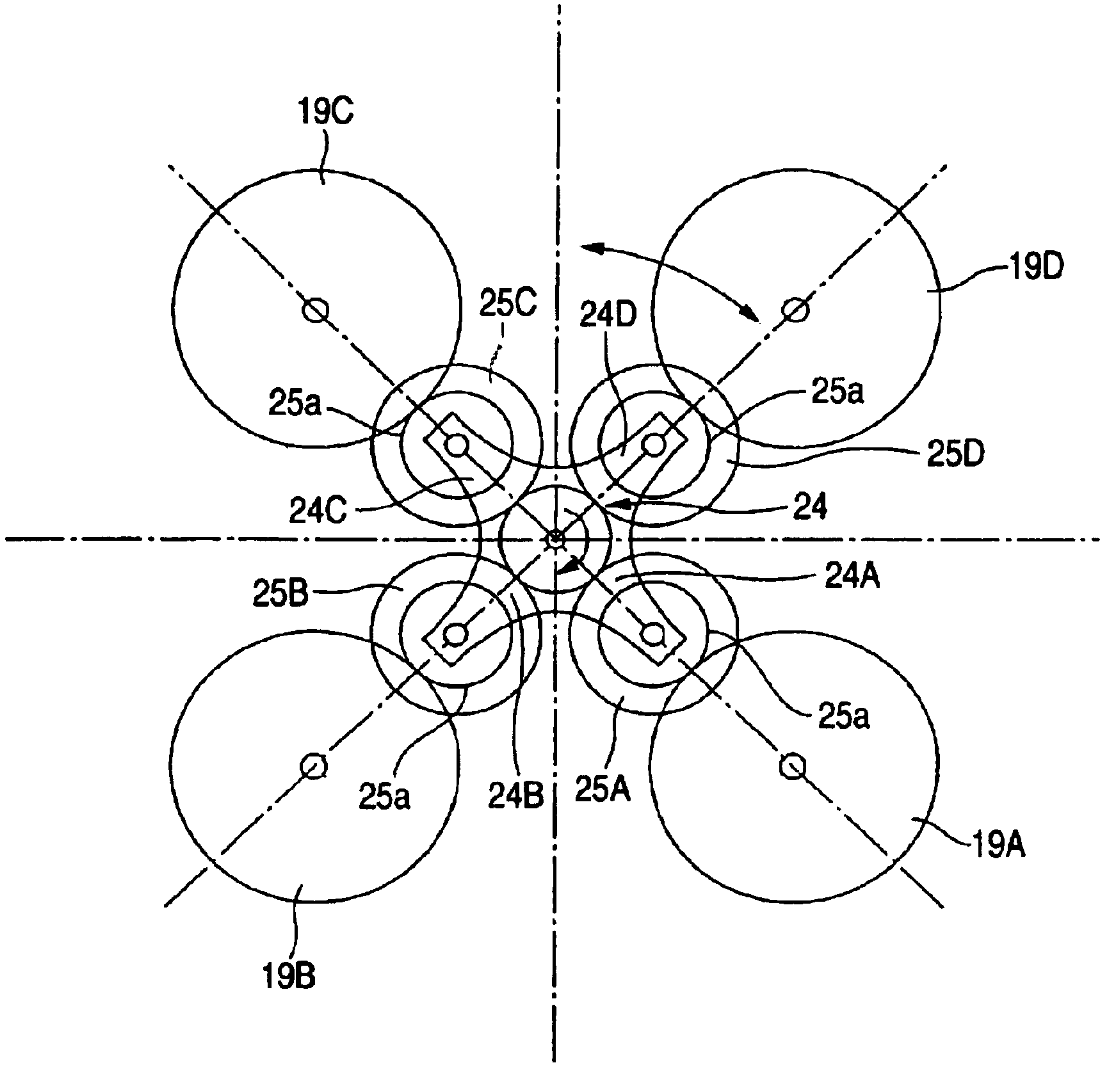

FIG. 6 is a partial, perspective view showing the pump unit with the releaser mechanism 14 omitted, FIG. 7 is a perspective view showing only the selector mechanism 13, and FIG. 8A is an exploded, perspective view showing the selector mechanism 13 and the releaser mechanism 14, FIG. 8B being a partial, cross sectional view showing a portion cut along the line A—A line. Also, FIG. 9 is a view illustrating the selector mechanism 13, and FIGS. 10A and 10B are views illustrating the releaser mechanism 14.

First, the selector mechanism 13 will be described with reference to FIGS. 4 to 9. The selector mechanism 13 comprises a sun gear 20 disposed at a substantial center of the unit casing 11 with an axis of rotation being vertical, a planetary carrier 21, a planetary gear 22 rotatably supported by the planetary carrier 21, and a revolution limiter 23 for restricting revolution of the planetary gear 22. The sun gear 20 is rotatably supported by the unit casing 11 and rotated in a first direction CW and a second direction CCW in accordance with forward and rearward driving of the motor 12 (see FIG. 7). The cylindrical-shaped planetary carrier 21 is rotatably supported by a columnar portion 20*b* (see FIG. 8A) extending downward and coaxially from a lower end of the sun gear 20. Formed on the planetary carrier 21 is a planetary spindle 21*a*, on which the planetary gear 22 is rotatably supported.

The four tube pumps 7A to 7D are arranged concentrically about the sun gear 20 in an angular spacing of 90 degrees (see FIG. 5), and pump drive gears 19A to 19D are mounted integrally and coaxially on upper ends of the pump drive shafts 17*a* of the respective tube pumps 7A to 7D.

The planetary gear 22 supported by the planetary carrier 21 meshes with the sun gear 20 such that when the sun gear 20 rotates, the planetary gear is made integral with the sun gear 20 to revolve around the sun gear 20. Also, the planetary gear 22 is formed integrally and coaxially at an upper end face with a reduction gear 22*a* of a small diameter to constitute a composite gear, and the respective pump drive gears 19A to 19D are disposed on a locus of revolution of the reduction gear 22*a*. Accordingly, when the planetary gear 22 is made to revolve, there comes about a state, in which the reduction gear 22*a* sequentially meshes with the respective pump drive gears 19A to 19D.

The revolution limiter 23 is constituted by a ratchet mechanism, and comprises a ratchet lever 26 rotatably provided on the planetary carrier 21, a coil spring 27 biasing the ratchet lever 26, and four ratchet teeth 11A to 11D formed on an inner peripheral face of a cylindrical-shaped portion 11*b*, which is formed on the unit casing 11 in a manner to cover the periphery of the planetary carrier 21 (see FIG. 9). The ratchet lever 26 rides over the ratchet teeth 11A to 11D to allow revolution of the planetary gear 22 in accordance with rotation of the sun gear 20 in the first direction CW. Also, revolution of the planetary gear 22 in accordance with rotation of the sun gear 20 in the second direction CCW is restricted in a position of engagement with the pump drive gears 19 by engagement between the ratchet lever 26 and the ratchet teeth 11A to 11D.

Described with reference to FIG. 9, four ratchet teeth 11A to 11D are formed in an angular interval of 90 degrees on the cylindrical-shaped portion 11*b*. The respective ratchet teeth 11A to 11D, respectively, being capable of preventing revolution of the planetary gear 22 in the second direction CCW in positions, in which the reduction gear 22*a* on the planetary gear 22 meshes with the respective pump drive gears 19A to 19D. Accordingly, after the sun gear 20 is rotated in the first direction CW to revolve (pump selecting action) the planetary gear 22 up to a position, in which it meshes with any one of the respective pump drive gears 19A to 19D being a driven object, the sun gear 20 is rotated in the second direction CCW, and then the ratchet lever 26 engages with any one of the ratchet teeth 11A to 11D for prevention of revolution.

As a result, there comes about a state in which the reduction gear 22*a* on the planetary gear 22 meshes with one pump drive gear. In this state, rotation of the planetary gear 22 causes forward driving (pump driving action) of the pump drive gears. In a state shown in FIG. 9, the planetary gear 22 meshes with the pump drive gear 19A.

Here, a revolving position of the planetary gear 22 is detected by two detectors S1, S2. The detector S1 serves to detect a revolving position (referred to as "position A") of the planetary gear 22, in which it meshes with the pump drive gear 19A of the tube pump 7A, and optically detects a single detection plate 21A (see FIGS. 7 and 8) extending outward from an outer peripheral face of the planetary carrier 21. The detector S2 serves to detect revolving positions (referred to as "positions B to D") of the planetary gear 22, in which it meshes with the pump drive gears 19B to 19D of the tube pumps 7B to 7D, and optically detects three detection plates 21B to 21D extending downward from a lower end face of the planetary carrier 21.

Here, in a state, in which the detection plate 21A is detected by the detector S1 as shown in FIG. 9, the planetary gear 22 is positioned to mesh with the pump drive gear 19A of the tube pump 7A. Also, the three detection plates 21B to 21D are arranged in an angular interval of 90 degrees and the planetary gear 22 is positioned to mesh with the pump drive gear 19B of the tube pump 7B in a state, in which the detection plate 21B is detected by the detector S2. Likewise, in a state, in which the detection plates 21C, 21D are detected by the detector S2, the planetary gear 22 is positioned to mesh with the pump drive gears 19C, 19D of the tube pumps 7C, 7D.

Accordingly, while the position A is determined only by a detected waveform (trailing edge) of the detector S1, the positions B to D assume a detected waveform of the detector S1 as a reference position waveform and may be determined by the number of waveforms of the detector S2, which are input thereafter. Such positional detection is performed in the controller 8 (see FIG. 1).

Subsequently, the releaser mechanism 14 will be described with reference to FIGS. 4, 5, 8A, 10A, 10B. The releaser mechanism 14 comprises a cross-shaped release planetary carrier 24, and four release planetary gears 25A to 25D rotatably supported by the release planetary carrier 24. The release planetary carrier 24 is provided rotatably and coaxially on a lever spindle 20*a* formed on an upper end of the sun gear 20 to project therefrom. The release planetary carrier 24 comprises four arm portions 24A to 24D projecting radially in an angular interval of 90 degrees, the respective arm portions 24A to 24D being provided integrally with downwardly extending planetary spindles (not shown). The release planetary gears 25A to 25D are provided corresponding to the pump drive gears 19A to 19D, and are rotatably supported by the respective planetary spindles of the release planetary carrier 24 in a state, in which they mesh with the sun gear 20.

Accordingly, the release planetary gears 25A to 25D revolve according to rotation of the sun gear 20 in the same direction as that of rotation of the sun gear. Also, when revolution of the release planetary gears 25A to 25D is inhibited, the respective release planetary gears 25A to 25D rotate according to rotation of the sun gear 20.

Here, the release planetary gears 25 are formed integrally on lower end faces thereof with reduction gears 25*a* to constitute composite gears as shown in FIG. 8B, the reduction gears 25*a* meshing with the respective pump drive gears 19A to 19D to inhibit revolution of the release planetary gears 25A to 25D when the release planetary gears 25A to 25D revolve corresponding to rotation of the sun gear 20 in the first direction CW. FIG. 10B shows this state, in which the release planetary gears 25A to 25D, of which revolution has been inhibited, rotate in a state, in which they mesh with the pump drive gears 19A to 19D, thus reversely driving (pump releasing action) the pump drive gears 19A to 19D.

Meanwhile, when the release planetary gears 25A to 25D revolve corresponding to rotation of the sun gear 20 in the second direction CCW, the release planetary carrier 24 strikes against a stopper (not shown), so that the above revolution is inhibited in a position, in which they do not mesh with the pump drive gears 19A to 19D. FIG. 10A shows this state.

In this manner, according to the embodiment, the respective release planetary gears 25A to 25D are movable between a position, in which they are disposed between the respective pump drive gears 19A to 19D as shown in FIG. 10A, and a position, in which they revolve 45 degrees in the first direction CW and the respective release planetary gears 25A to 25D mesh with the respective pump drive gears 19A to 19D as shown in FIG. 10B.

In addition, a reduction ratio is set in the embodiment such that the rotation speed of the respective pump drive gears 19A to 19D driven by the release planetary gears 25A to 25D is made less than that of the respective pump drive gears 19A to 19D driven by the planetary gear 22 of the selector mechanism 13. Thereby, it is possible to avoid an inconvenience that when the planetary gear 22 passes positions, in which it meshes with the respective pump drive gears 19A to 19D, the respective pump drive gears 19A to 19D are too large in reverse driving speed to inhibit passage of the planetary gear 22.

Figure 11:
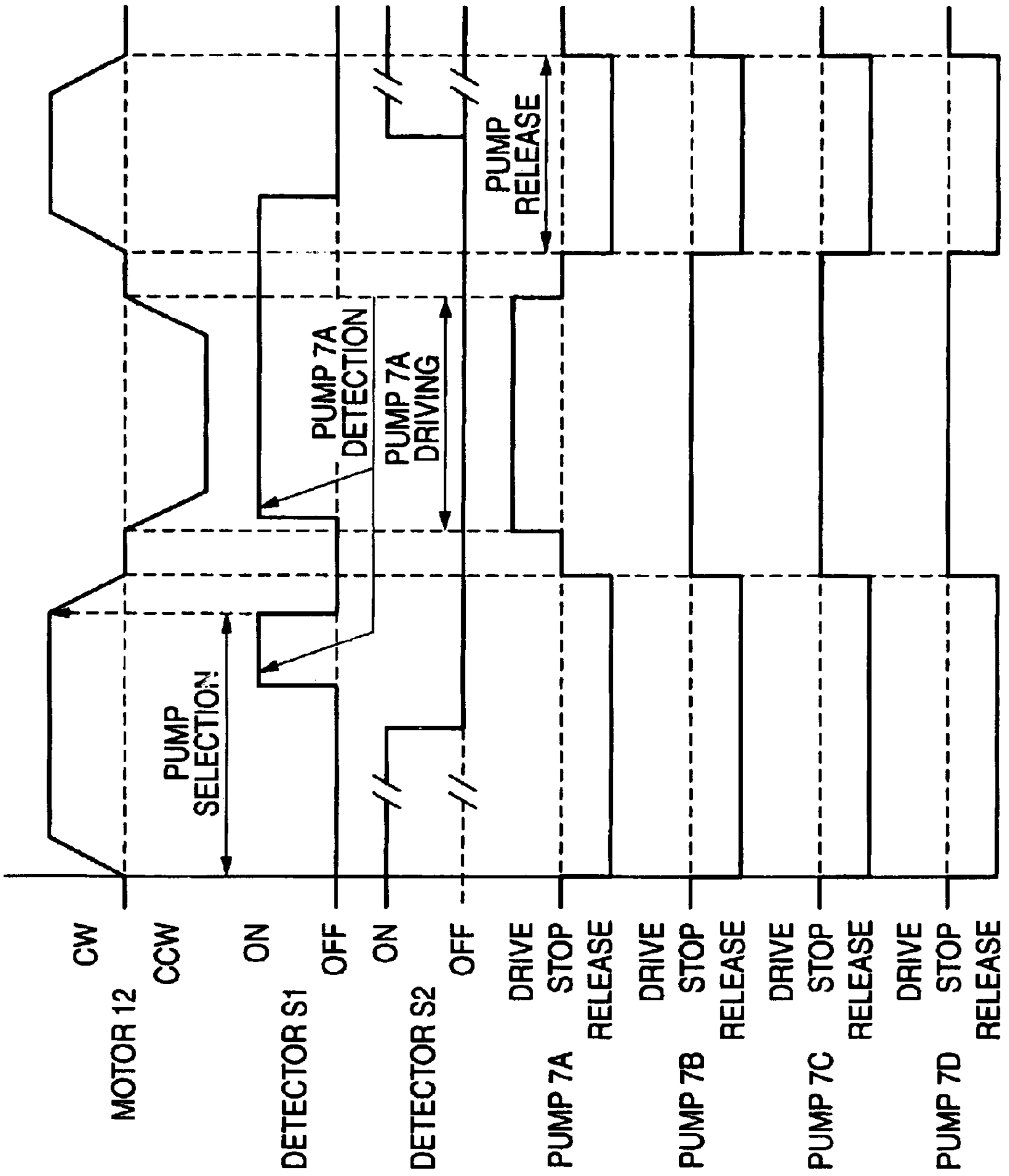
FIG. 11 is a timing chart indicating an example of an operation of the pump unit.

An example of an action of the pump unit 10 will be described with reference to FIGS. 11 to 13. A timing chart shown in FIG. 11 indicates an action of selecting and driving the tube pump 7A and stopping the same. As shown in this figure, the motor 12 is first driven in the first direction CW to begin a pump selecting action. In the course of the pump selecting action, the respective tube pumps 7A to 7D are reversely driven as shown in FIG. 10B to perform a release action. When a positional waveform of the detector S1 is detected in the course of the pump selecting action, the motor 12 is driven in the second direction CCW to perform the driving action of the tube pump 7A. FIGS. 9 and 10A show states of the selector mechanism 13 and the releaser mechanism 14 at this time.

Subsequently, when driving of the tube pump 7A is to be stopped, the motor 12 is also driven in the first direction CW to perform a pump releasing action (FIG. 10B), and thereafter the motor 12 is stopped.

Figure 12:
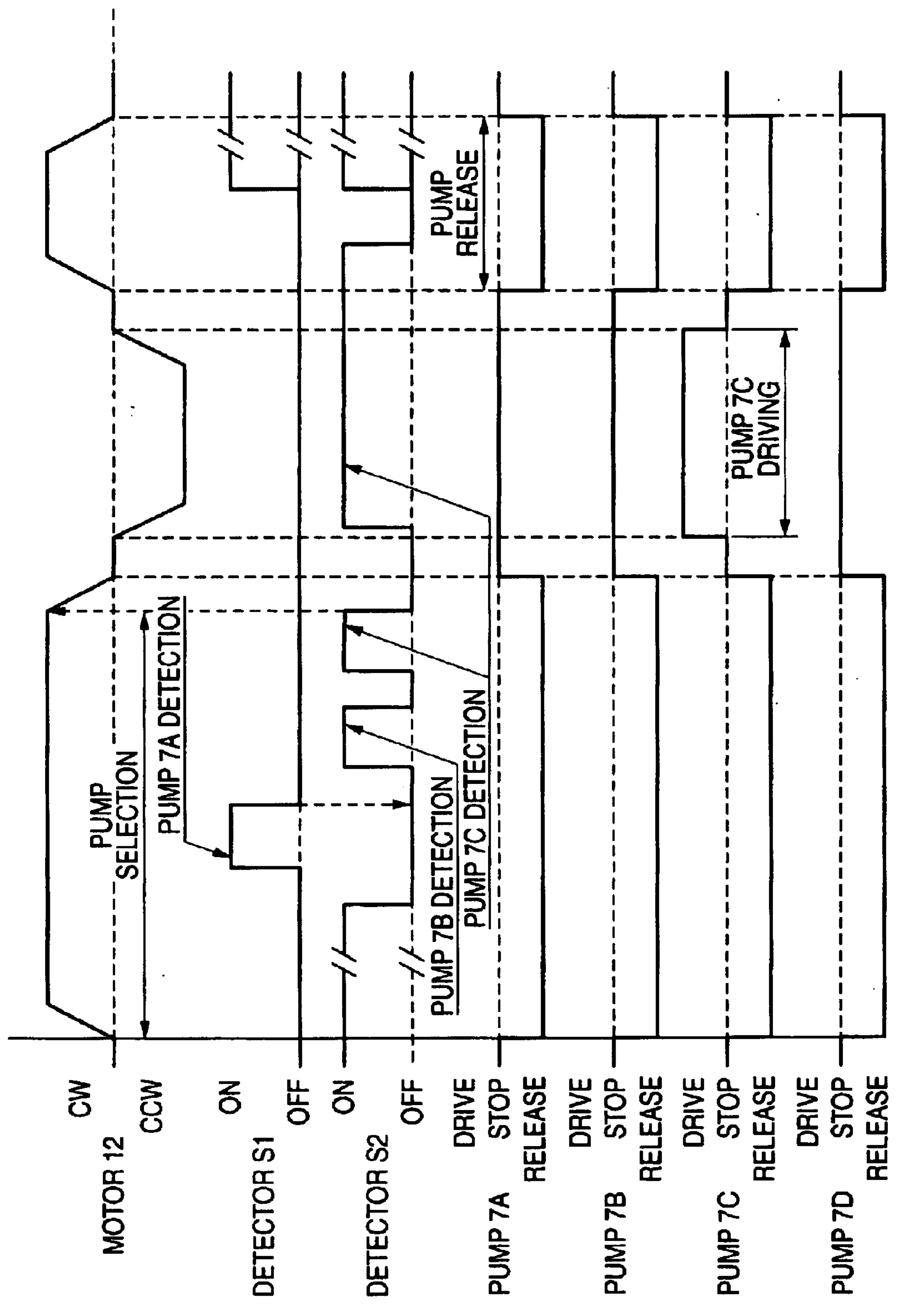
FIG. 12 is a timing chart indicating another example of an operation of the pump unit.

A timing chart shown in FIG. 12 indicates the case where the tube pump 7C is selected and driven, and then stopped. As shown in this figure, the motor 12 is first driven in the first direction CW to begin a pump selecting action. When a positional waveform of the detector S1 is detected and thereafter a positional waveform of the detector S2 is detected twice in the course of the pump selecting action, the motor 12 is driven in the second direction CCW to perform the driving action of the tube pump 7C. Then, when driving of the tube pump 7C is to be stopped, the motor 12 is also driven in the first direction CW to perform a pump releasing action, and thereafter the motor 12 is stopped.

Figure 13:
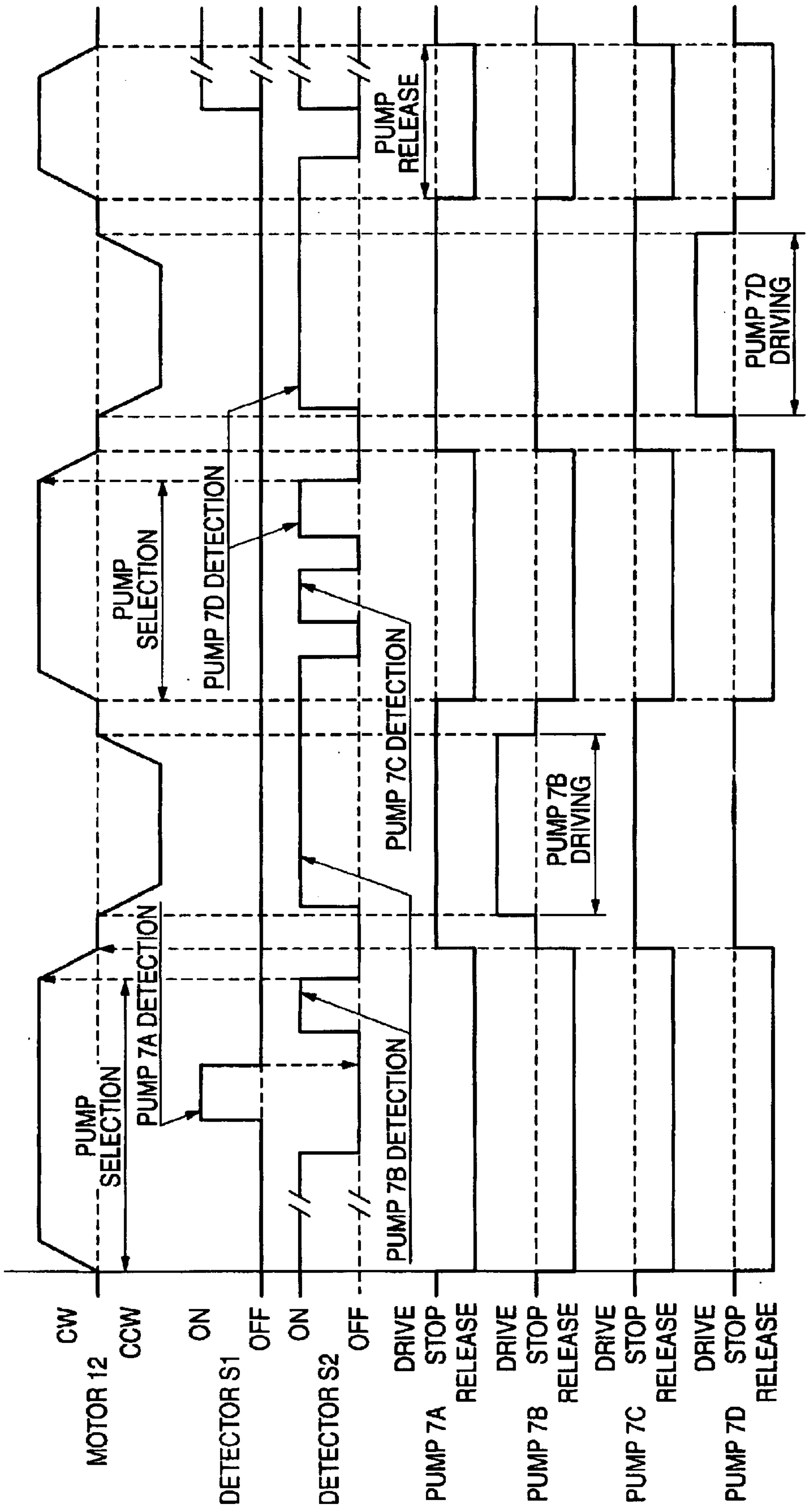
FIG. 13 is a timing chart indicating still another example of an operation of the pump unit.

A timing chart shown in FIG. 13 indicates the case where the tube pump 7B is selected and driven, and then the tube pump 7D is selected and driven. First, the motor 12 is driven in the first direction CW to begin a pump selecting action. When a positional waveform of the detector S1 is detected and thereafter a positional waveform of the detector S2 is detected once in the course of the pump selecting action, the motor 12 is driven in the second direction CCW to perform the driving action of the tube pump 7B. Subsequently, the motor 12 is driven in the first direction CW to resume the pump selecting action, and when a positional waveform of the detector S2 is detected twice, the motor 12 is driven in the second direction CCW to perform the driving action of the tube pump 7D. Then, when driving of the tube pump 7D is to be stopped, the motor 12 is again driven in the first direction CW to perform the pump releasing action, and thereafter the motor 12 is stopped.

As described above, the pump unit 10 in the ink jet printer according to the embodiment comprises the four tube pumps 7A to 7D for supplying ink of respective colors to the ink tanks 4A to 4D, the single motor 12, and the selector mechanism 13, which is caused by torque input from the motor 12 in the first direction CW to select the pumps A to D being an object or objects driven and by torque input from the motor 12 in the second direction CCW to drive the pumps A to D as selected.

The selector mechanism 13 comprises the planetary gear 22 capable of meshing with the respective pump drive gears 19A to 19D according to a revolving position, and the revolution limiter 23 for restricting revolution of the planetary gear 22, the revolution limiter 23 being composed of a ratchet mechanism.

Accordingly, downsizing and cost reduction of the pump unit 10 can be attained according to the embodiment since the single motor 12 selectively drives the four tube pumps 7A to 7D to eliminate the need of separately providing actuators such as solenoids or the like. Therefore, it is possible to achieve small-sizing and cost reduction of the ink jet printer 1, on which the pump unit 10 is mounted.

Also, the selector mechanism 13 comprises the detectors S1, S2 for detecting a revolving position of the planetary gear 22, so that selective driving of the tube pumps 7A to 7D can be done surely by controlling the motor 12 in forward and rearward driving on the basis of the positional detection of the detectors S1, S2. Also, inexpensive motors other than step motors can be used as a drive source.

Further, the embodiment comprises the releaser mechanism 14 for returning the tube pumps to a release state, the releaser mechanism 14 being composed of the release planetary carrier 24 and the release planetary gears 25A to 25D such that rotation of the sun gear 20 in the first direction CW is made use of to mesh the release planetary gears 25A to 25D with the pump drive gears 19A to 19D for the release action, and rotation of the sun gear 20 in the second direction CCW is made use of to release meshing of the release planetary gears 25A to 25D with the pump drive gears 19A to 19D. Accordingly, the releasing action can be realized with a simple construction. Also, since when the planetary gear 22 passes positions, in which it meshes with the respective pump drive gears 19, the respective pump drive gears 19 are put in a reverse driven state, a suitable load is applied to the planetary gear 22, so that the planetary gear 22 can pass meshing positions smoothly.

Besides, a reduction ratio in the power transmitting path is set in the embodiment such that the rotation speed of the pump drive gears 19A to 19D driven by the release planetary gears 25A to 25D is made less than that of the pump drive gears 19A to 19D driven by the planetary gear 22 of the selector mechanism 13. Accordingly, it is possible to avoid an inconvenience that when the planetary gear 22 passes positions, in which it meshes with the respective pump drive gears 19, the respective pump drive gears 19 are too large in reverse driving speed to inhibit passage of the planetary gear 22.

In addition, while tube pumps are used as ink pumps in the embodiment, it is possible to use various types of pumps such as diaphragm pumps, piston pumps or the like. Also, while the ink pumps are four in number in the embodiment, the invention is likewise applicable to a plurality of ink pumps, for example, the case where the number is three or five or more.

Further, it is possible in the embodiment to house the waste ink pump 9*a* in the pump unit 10 to selectively drive the waste ink pump 9*a*.

An explanation will be given of the construction of the ink tanks 4A to 4D in the ink jet printer 1 and the replenishing action of ink therefor with reference to FIGS. 14 to 17.

Figure 14:
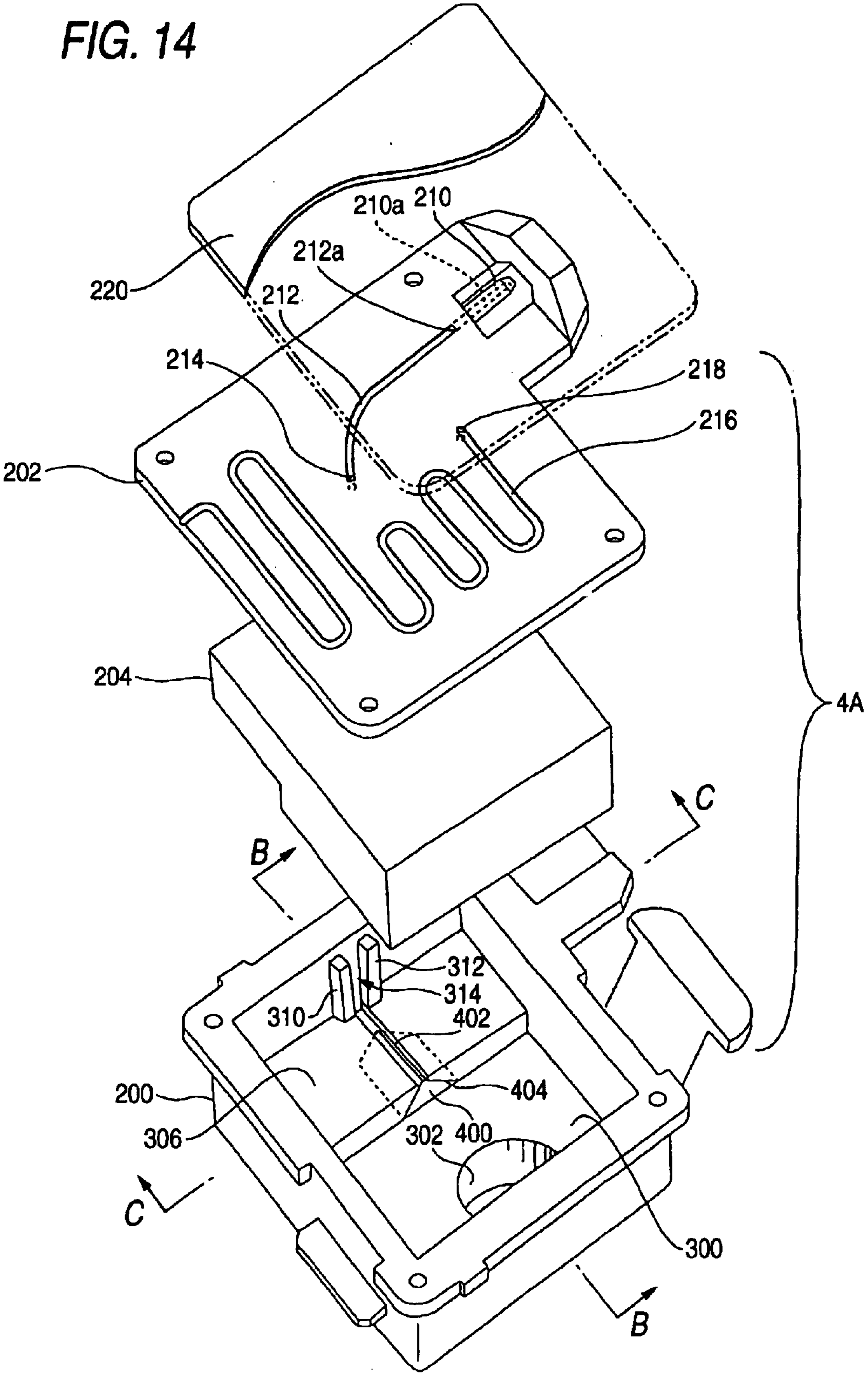
FIG. 14 is an exploded, perspective view showing an ink tank.

First, since the ink tanks 4A to 4D are of the same construction, the construction of the ink tank 4A is explained. FIG. 14 is an exploded, perspective view showing the ink tank. The ink tank 4A comprises a substantially cubical-shaped casing 200 with one side thereof open, a roof plate 202 covering the open side face of the casing 200, and a sheet 220 heat-welded to the roof plate 202 for covering an ink supply groove 212 and a ventilating groove 216, which are formed on a top face of the roof plate 202 and described later. The ink tank 4A is mounted in position within the ink jet printer 1 with the roof plate 202 upward and the casing 200 downward.

Received in the casing 200 is an absorber 204 for absorbing and holding ink. The absorber 204 is composed of a material, for example, felt, which causes no ink spilling until ink is fully absorbed. The casing 200 defines a storage chamber for storing the absorber 204.

Formed on a side end face of the roof plate 202 is an ink supplying portion 210, by which ink supplied from the external tank 5 (see FIG. 1) is fed to the ink tank 4A. The ink supplying portion 210 is pipe-shaped to permit mounting of the ink tube 6. The ink supply groove 212 is formed on the face of the roof plate 202, and a starting end 212*a* of the ink supply groove 212 is communicated to a hollow portion 210*a* of the ink supplying portion 210. The ink supply groove 212 is extended curvilinearly from the ink supplying portion 210 toward a center of the roof plate 202. Formed at a terminal end of the ink supply groove 212 is a through hole 214 extending through the roof plate 202 in a thickness direction thereof. Also, the ink supply groove 212 is closed by the sheet 220 heat-welded to the roof plate 202. Accordingly, ink supplied from the ink supplying portion 210 is conducted inside the ink tank 4A via an ink supply passage having a closed cross section and formed by the ink supply groove 212 and the sheet 220.

Formed further on the roof plate 202 is the ventilating groove 216 affording ventilation of air inside and outside the ink tank 4A. The ventilating groove 216 extends meanderingly from the side end face of the roof plate 202 to a central region of the roof plate 202, and a through hole 218 extending through the roof plate 202 in a thickness direction thereof is formed at a terminal end of the groove. The reason why the ventilating groove 216 is formed in a meandering shape is to suppress evaporation of ink in the ink tank 4A.

Figure 15:
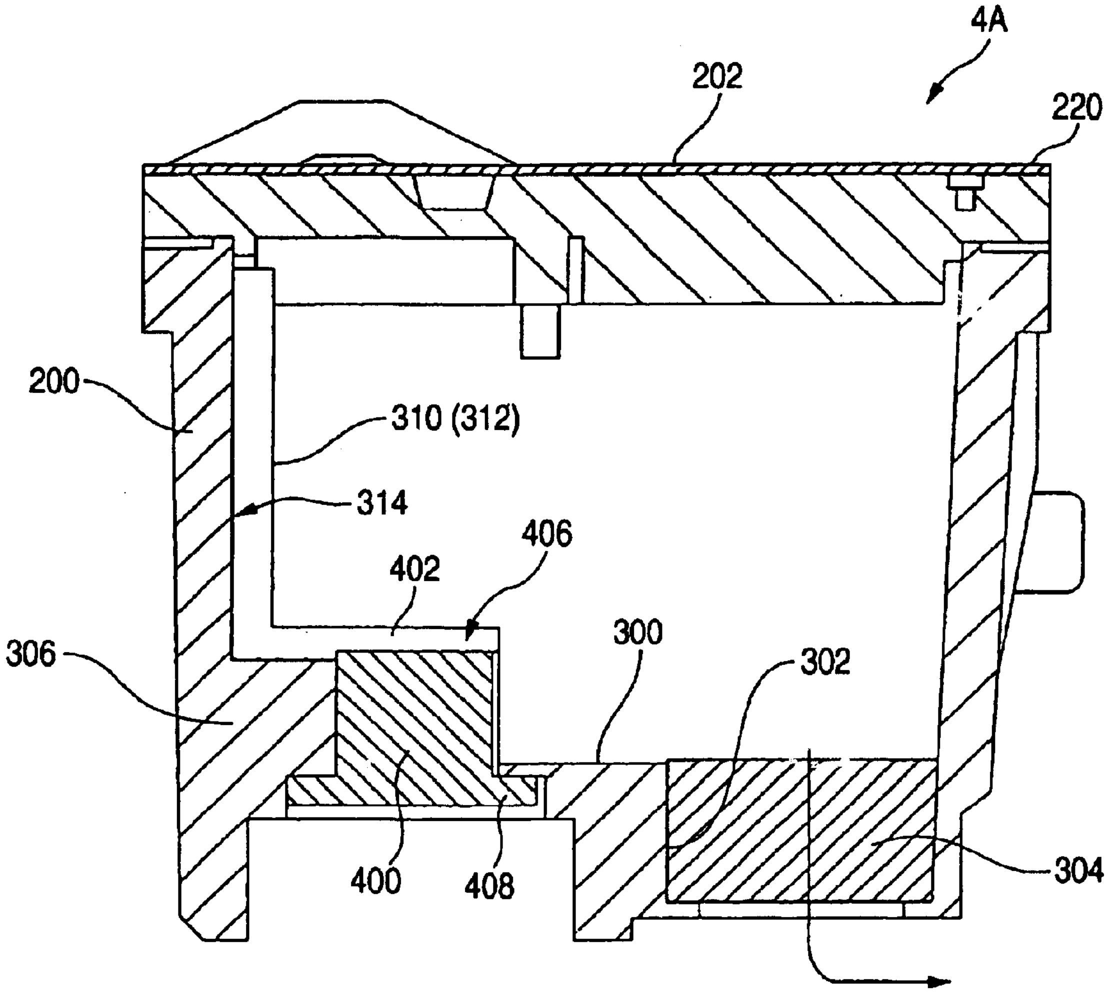
FIG. 15 is a cross sectional view taken along the line B—B in the ink tank of FIG. 14.

FIG. 15 is a cross sectional view taken along the line B—B in the ink tank 4A of FIG. 14. Formed on a bottom 300 of the casing 200 is a discharge port 302 for feeding ink in the absorber 204 into a print head 108. Mounted on the discharge port 302 is a discharge nozzle 304 for discharging ink. The bottom 300 of the casing 200 is stepwise in a manner to be formed low on a side (right side in the figure) of the discharge port 302 and formed high on an opposite side (left side in the figure). The portion formed high is a step portion 306.

Figure 16:
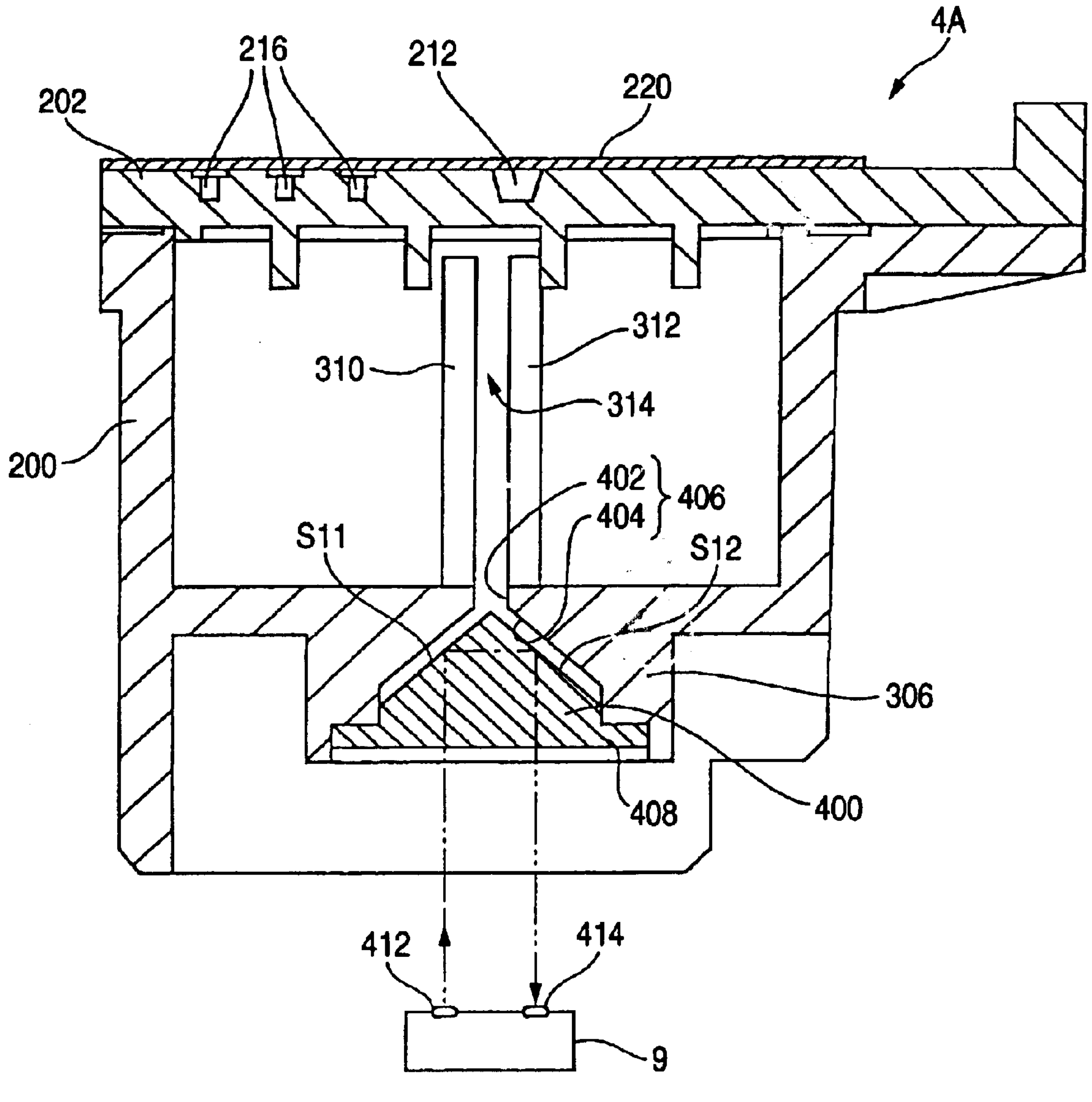
FIG. 16 is a cross sectional view taken along the line C—C in the ink tank of FIG. 14.

FIG. 16 is a cross sectional view taken along the line C—C in the ink tank 4A of FIG. 14. Formed on the above step portion 306 in a lower area of the casing 200 is an inverted V-shaped groove 404 (an upper portion is narrow and a lower portion spreads). Further, formed on an upper face of the step portion 306 is a through groove 402 communicating with the inverted V-shaped groove 404.

A prism 400 is mounted in the inverted V-shaped groove 404. The prism 400 comprises a transparent pedestal 408 formed on a side of a substantially triangular prism. The prism 400 is mounted on the step portion 306 with the pedestal 408 downward and two sides S11, S12 facing the extended faces of the inverted V-shaped groove 404. A predetermined clearance is formed between the sides S11, S12 of the prism 400 and the extended faces of the inverted V-shaped groove 404. The clearance between the prism 400 and the inverted V-shaped groove 404 and the through groove 402 define an ink passage 406 for causing inflowing of ink spilled from the absorber 204.

The optical sensors 9 are provided below the prism 400. The optical sensors 9 comprise a photo emitter 412 to irradiate light on the prism 400, and a photo detector 414 to receive a reflected light from the prism 400. The positional relationship between the optical sensors 9 and the prism 400 is set so that light irradiated from the photo emitter 412 transmits through an interior of the prism 400 to be reflected sequentially by the sides S11, S12 to be incident upon the photo detector 414. In the case where ink is present in the clearance between the prism 400 and the inverted V-shaped groove 404, however, light is absorbed by the sides S11, S12 on the prism 400, and so no light is incident upon the photo detector 414. The controller 8 (see FIG. 1) may judge whether ink is spilled, on the basis of whether the photo detector 414 of the optical sensors 9 receives an incident light.

In addition, the optical sensors 9 may be mounted on the ink jet printer 1 or the ink tank 4A. In the former case, the prism 400 and the optical sensors 9 face each other in a state, in which the ink tank 4A is mounted on the ink jet printer 1.

As shown in FIG. 14, two parallel ridges 310, 312 extending near an upper end of the casing 200 are formed on a side face of a side, on which the step portion 306 is formed, in the casing 200. The two ridges 310, 312 define therebetween a groove 314, which is communicated to the through groove 402 formed on the step portion 306. The groove 314 permits escape of air in the ink passage 406 when ink spilled from the absorber 204 flows into the ink passage 406. Air flowing along the groove 314 is conducted above the casing 200 to flow outside through the ventilating groove 216 and the through hole 218 formed in the roof plate 202.

Figure 17:
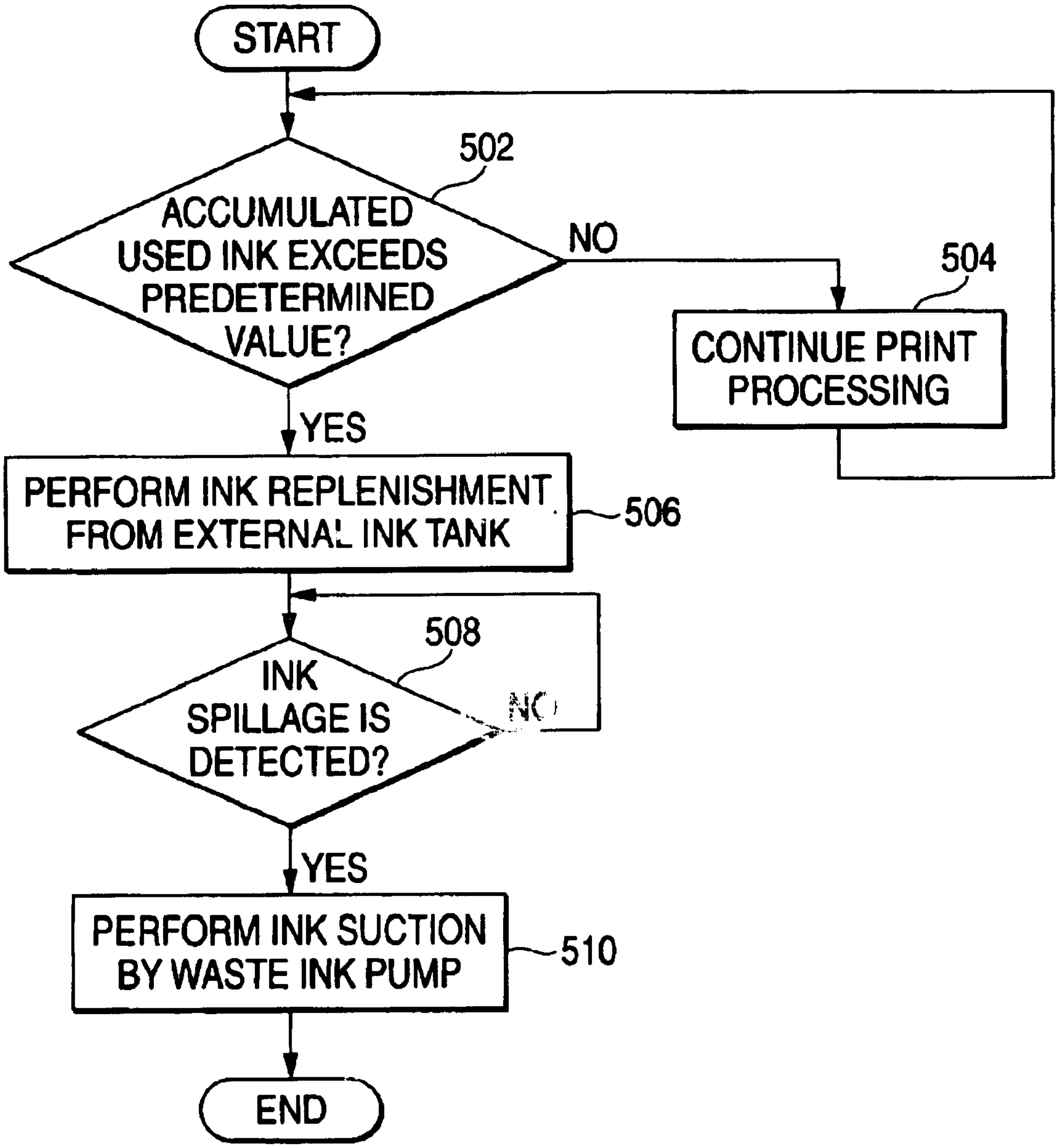
FIG. 17 is a flowchart indicating an ink supply processing in the ink jet printer.

FIG. 17 is a flowchart indicating the action of the ink jet printer 1, the procedure in the flowchart being implemented by the controller 8. When the printing processing in the ink jet printer 1 is started, the controller 8 calculates an accumulated quantity of ink used up to now from the last supplying of ink to the ink tanks 4A to 4D, on the basis of operation information of the print head 2, and compares the accumulated quantity with a predetermined value (step 502). In the case where the accumulated quantity of ink used is smaller than the set value (NO in step 502), it is judged that a sufficient quantity of ink is still left in the ink tanks 4A to 4D, and the printing processing is continued (step 504). Here, the printing processing includes drawing of ink performed by the waste ink pump 9*a* as well as the printing action of the print head 2.

When the printing processing proceeds and the accumulated quantity of ink used reaches the set value (YES in step 502), the controller 8 drives corresponding tube pumps 7A to 7D in the pump unit 10 to cause the same to supply ink to the ink tanks 4A to 4D from the external tank 5 (step 506). For example, the ink tank 4A is replenished with ink in the following manner. Since the absorber 204 causes no spillage of ink until it is fully filled with ink, no ink flows into the ink passage 406 at this point of time. In this state, light emitted from the photo emitter 412 of the optical sensors 9 transmits through an interior of the prism 400 to be reflected by the sides S11, S12 to be incident upon the photo detector 414. Thereby, the controller 8 judges that no ink is spilled from the absorber 204. In this case (NO in step 508), the controller 8 continues driving of the tube pump 7A.

Meanwhile, when the absorber 204 is fully filled with ink, ink is spilled therefrom. Ink spilled flows below the absorber 204 to flow into the ink passage 406. Air pushed out by the inflowing ink in the ink passage 406 flows outside through the groove 314. In a state, in which ink flows into the ink passage 406, since light emitted from the photo emitter 412 of the optical sensor 410 is absorbed by the sides S11, S12, it is not incident upon the photo detector 414. Thereby, the controller 8 judges that ink is spilled from the absorber 204.

In this case (YES in step 508), the controller 8 stops driving of the tube pump 7A, whereby supplying of ink to the ink tank 4A is stopped. The controller 8 further drives the waste ink pump 9*a* to cause the same to draw ink (step 510). Since negative pressure is generated in the print head 2 as the waste ink pump 9*a* draws ink, a small quantity of ink is drawn (to the print head 2) from the ink tank 4A. Thereby, ink left in the ink passage 406 of the ink tank 4A is absorbed, and the ink tank 4A is maintained negative in pressure.

As described above, as spillage of ink from the absorber 204 in the ink tanks 4A to 4D is detected according to the embodiment, it is possible to stop supplying of ink to the ink tanks 4A to 4D at a point of time when the absorber 204 is filled with ink. In this manner, since it is possible to automatically fill the absorber 204 with ink when ink is supplied to the ink tanks 4A to 4D, failure in printing caused by insufficiency in a quantity of ink left can be prevented. Also, it is also possible to prevent leakage of ink caused by oversupply to the ink tanks 4A to 4D.

Further, ink is detected in the ink passage 406, into which spilled ink flows, so that it is possible to surely detect the spilled ink. Also, air is permitted to escape along the groove 314 when ink flows into the ink passage 406, so that ink is easy to flow into the ink passage 406.

Besides, ink is detected by the combination of the prism 400 and the optical sensors 9, so that sure detection of ink can be made with a simple configuration. Further, the absorber 204 may be formed from, for example, felt, and so until the absorber 204 fully absorbs ink, ink is prevented from being spilled.

While an embodiment of the invention has been described with reference to the drawings, the invention is not limited to matters shown in the embodiment and covers a scope, in which a person skilled in the art can perform modification and application on the basis of the descriptions in the claims and the specification, and known related art.

While for example, the four tube pumps 7A to 7D are arranged concentrically in an angular interval of 90 degrees about the sun gear, the tube pumps are not limited in number, angle or concentrical arrangement described above. The tube pumps may be, for example, three or six in number, and making mention of an angle, a similar effect is obtained provided that the detection plates 21B to 21D are arranged in an angular interval corresponding to the respective positions of the pumps. Making mention of arrangement, it will do provided that the pump gears mesh with the planetary gear, for example, one of the pump gears may be made non-concentric with other pump gears so that it meshes directly with the planetary gear 22.

What is claimed is:

1. A pump driver for selectively driving a plurality of pumps, comprising:

a drive source;

a sun gear, rotated by the drive source;

a planetary gear, meshed with the sun gear;

a planetary carrier, which rotatably supports the planetary gear revolvably around the sun gear;

a plurality of driving gears, arranged with respect to the pumps such that the planetary gear meshes with one of the driving gears to selectively drive one of the pumps; and a revolution limiter, which allows a revolution of the planetary gear in a first direction and restricts a revolution of the planetary gear in a second direction opposite to the first direction at a position where the planetary gear meshes with the one of the driving gears.

2. The pump driver as set forth in claim 1, wherein the revolution limiter includes a ratchet mechanism.

3. The pump driver as set forth in claim 2, wherein the ratchet mechanism includes:

a ratchet lever, provided on the planetary carrier; and ratchet teeth, arranged with respect to the pumps, to which the ratchet lever engages.

4. The pump driver as set forth in claim 1, further comprising a revolution position detector, which detects a revolution angle of the planetary gears.

5. The pump driver as set forth in claim 4, wherein the revolution position detector includes:

a plurality of detection pieces, arranged with respect to the pumps;

a first detector, which detects a predetermined one of the detection pieces, so that it is detected when the planetary gear meshes with a predetermined one of the driving gears; and a second detector, which detects remaining ones of the detection pieces, so that it is detected when the planetary gear meshes with any one of remaining ones of the driving gears.

6. The pump driver as set forth in claim 1, wherein:

each of the pumps includes a flexible tube; and each of the pumps is operable to compress the flexible tube when an associated one of the driving gears is rotated in a forward direction, and release a compressed state of the flexible tube when the associated one of the driving gears is rotated in a rearward direction.

7. The pump driver as set forth in claim 6, further comprising:

a plurality of release planetary gears, provided with respect to the pumps and meshed with the sun gear; and a release planetary carrier, which rotatably supports the release planetary gears revolvably around the sun gear, wherein:

the release planetary gears mesh with the driving gears when the planetary gears are revolved in the first direction at a predetermined angle; and the release planetary gears are disengaged from the driving gears when the planetary gears are revolved in the second direction.

8. The pump driver as set forth in claim 7, wherein a first rotation speed of the driving gears established by the release planetary gears is lower than a second speed of the driving gears established by the planetary gear.

9. An ink jet printer, comprising:

a print head;

a plurality of tanks, each storing ink therein;

a plurality of pumps, each associated with one of the tanks;

a drive source;

a sun gear, rotated by the drive source;

a planetary gear, meshed with the sun gear;

a planetary carrier, which rotatably supports the planetary gear revolvably around the sun gear;

a plurality of driving gears, arranged with respect to the pumps such that the revolved planetary gear meshes with one of the driving gears to selectively drive one of the pumps; and a revolution limiter, which allows a revolution of the planetary gear in a first direction and restricts a revolution of the planetary gear in a second direction opposite to the first direction at a position where the planetary gear meshes with the one of the driving gears.

10. An ink jet printer, comprising:

a print head;

a plurality of internal tanks, each storing ink therein supplied from a corresponding one of a plurality of external tanks, and to be supplied to the print head;

a plurality of pumps, each associated with one of the internal tanks;

a detector, which detects an amount of ink in each of the internal tanks; and a pump driver, which selectively drives the pumps in accordance with an output of the detector, the pump driver including:

a drive source;

a sun gear, rotated by the drive source;

a planetary gear, meshed with the sun gear;

a planetary carrier, which rotatably supports the planetary gear revolvably around the sun gear;

a plurality of driving gears, arranged with respect to the pumps such that the revolved planetary gear meshes with one of the driving gears to selectively drive one of the pumps; and a revolution limiter, which allows a revolution of the planetary gear in a first direction and restricts a revolution of the planetary gear in a second direction opposite to the first direction at a position where the planetary gear meshes with the one of the driving gears.

* * * * *